United States Patent
Hind et al.

(10) Patent No.: US 6,826,690 B1
(45) Date of Patent: *Nov. 30, 2004

(54) USING DEVICE CERTIFICATES FOR AUTOMATED AUTHENTICATION OF COMMUNICATING DEVICES

(75) Inventors: John R. Hind, Raleigh, NC (US); Marcia L. Peters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/435,417

(22) Filed: Nov. 8, 1999

(51) Int. Cl.[7] .............................. H04L 9/00; H04L 9/32; G06F 11/30; G06F 12/14
(52) U.S. Cl. ........................ 713/186; 713/173; 713/175; 713/176; 713/200; 713/201
(58) Field of Search ................................ 713/155, 161, 713/169, 173, 202, 200, 201; 709/201, 223, 225, 191; 370/252

(56) References Cited

U.S. PATENT DOCUMENTS

| | | | | |
|---|---|---|---|---|
| 5,214,702 A | * | 5/1993 | Fischer ........................ 380/30 |
| 5,784,560 A | * | 7/1998 | Kingdon et al. ............ 709/201 |
| 5,790,548 A | * | 8/1998 | Sistanizadeh et al. ....... 370/401 |
| 5,815,664 A | * | 9/1998 | Asano ........................ 709/227 |
| 6,009,177 A | * | 12/1999 | Sudia ........................ 713/191 |
| 6,088,805 A | * | 7/2000 | Davis et al. ................. 713/202 |
| 6,101,182 A | * | 8/2000 | Sistanizadeh et al. ....... 370/352 |
| 6,138,158 A | * | 10/2000 | Boyle et al. ................ 709/225 |
| 6,185,678 B1 | * | 2/2001 | Arbaugh et al. ............... 713/2 |
| 6,249,873 B1 | * | 6/2001 | Richard et al. ............. 713/200 |
| 6,324,645 B1 | * | 11/2001 | Andrews et al. ............ 713/157 |
| 6,374,295 B2 | * | 4/2002 | Farrow et al. .............. 709/223 |
| 6,452,925 B1 | * | 9/2002 | Sistanizadeh et al. ....... 370/352 |
| 6,484,258 B1 | * | 11/2002 | Haverty ...................... 713/155 |
| 6,560,642 B1 | * | 5/2003 | Nurmann ..................... 709/220 |
| 6,560,706 B1 | * | 5/2003 | Carbajal et al. ............ 713/155 |
| 6,601,171 B1 | * | 7/2003 | Carter et al. ................ 713/175 |
| 6,611,869 B1 | * | 8/2003 | Eschelbeck et al. ........ 709/228 |
| 6,615,347 B1 | * | 9/2003 | de Silva et al. ............ 713/156 |
| 6,636,485 B1 | * | 10/2003 | Fijolek et al. .............. 370/252 |
| 6,654,387 B1 | * | 11/2003 | Beser et al. ................ 370/485 |
| 6,657,991 B1 | * | 12/2003 | Akgun et al. ............... 370/352 |

FOREIGN PATENT DOCUMENTS

| | | | |
|---|---|---|---|
| EP | 0386867 | 12/1990 | ............ H04L/9/32 |
| GB | 2344977 | 6/2000 | ............ H04L/9/32 |
| WO | 9712460 | 4/1997 | ............ H04L/9/00 |
| WO | 9837655 | 8/1998 | ............ H04K/1/00 |

OTHER PUBLICATIONS

"SDIS—A Simple Distributed Security Infrastructure" by R. L. Rivest, Laboratory for Computer Science, Massachusetts Institute of Technology, Cambridge, MA and B. Lampson, Microsoft Corporation, Sep. 15, 1996, http://theory.lcs.mit.edu/~rivest/sdsi10.html.

* cited by examiner

Primary Examiner—Ayaz Sheikh
Assistant Examiner—Christian LaForgia
(74) Attorney, Agent, or Firm—Jerry W. Herndon; Jeanine S. Ray-Yarletts; Marcia L. Doubet

(57) ABSTRACT

A device certificate identifies a particular device using a globally-unique device identifier and contains a public key associated therewith. A private key stored in protected storage of the device is used to digitally sign outbound messages, enabling communicating devices to authenticate one another using the associated device certificate and public key, before returning a response. Devices functioning as servers can thereby securely participate in dynamic, automatic address assignment services using a service such as a Boot Protocol or Dynamic Host Configuration Protocol, and/or to update address information stored in a Domain Name System (DNS) server, ensuring that the update is authentic, and when the DNS is also authenticated, ensuring that a legitimate DNS has been contacted.

47 Claims, 14 Drawing Sheets

| Prior Art Fields |
|---|
| 305 · issuer |
| 310 · subject |
| 315 · subject public key |
| 320 · capability indicator flags<br>      address provider    1 bit 321<br>      DNS server           1 bit 322 |
| 325 · digital signature |

| 505 | Device Identifier |
|---|---|
| 510 | Prior Art Message Content (such as DHCP DISCOVER) |
| 515 | Device Certificate |
| 520 | Random Number |
| 525 | Digital Signature |

| 535 | Device Identifier |
|---|---|
| 540 | Prior Art Message Content (such as DHCP OFFER) |
| 545 | Device Certificate |
| 550 | Random Number |
| 555 | Locally Significant Timestamp |
| 560 | Digital Signature |

| | |
|---|---|
| 575 | Prior Art Message Content (such as DHCP REQUEST) |
| 580 | Timestamp |
| 585 | Digital Signature |

USING DEVICE CERTIFICATES FOR AUTOMATED AUTHENTICATION OF COMMUNICATING DEVICES

Related Invention

This application is related to the application having Ser. No. 09/435,415 entitled "Using Device Certificates to Authenticate Servers Before Automatic Address Assignent", assigned to the same assignee and filed concurrently herewith on Nov. 8, 1999.

BACKGROUND OF THE INVENTION

1. Field of the Invention

The present invention relates to a computer system, and deals more particularly with a method, system, and computer program product for using device certificates for automated authentication of communicating devices.

2. Description of the Related Art

In client-server networking environments, a device functioning as a client generally seeks to locate a device functioning as a server in order to access data (such as a Web page, a traditional flat file, etc.) or perform transactions with application programs executing on the server. Neither clients nor servers typically attempt to locate other clients—that is, communications are usually established by the client and not by the server. The client typically locates a server that can perform the desired service by issuing a get_host_by_name( ) function call (or equivalent) using a known host name (such as an Internet Protocol, or IP, name), in order to resolve this server host name to a server address (such as an IP address). The get_host_by_name( ) function call causes a query to be issued to a Domain Name System (DNS) service. A DNS server maintains a stored mapping of host names to IP addresses. Upon receiving a query for a particular host name, the DNS server can then return the stored IP address mapped to (i.e. associated with) that host name. These stored mappings are typically statically administered, and therefore it is typically important for a particular host name to have a constant IP address in order to facilitate dynamic access to that host (i.e. server) in a predictable manner that is independent of factors such as the timing of issuing the get_host_by_name( ) call. Traditionally, enabling use of a constant IP address is achieved by statically configuring the server's IP address at the server itself and at the DNS.

Client and server devices tend to attach to a network dynamically, and remain attached for varying lengths of time. Each such device must obtain a network address (such as an IP address), if it has not already been configured with one, in order to participate in network communications. In local area network (LAN) configurations, it is common practice to dynamically assign an IP address to a device when it connects to the LAN (for instance, when the device powers on). Protocols such as the Bootstrap Protocol (also known as "BootP") and the Dynamic Host Configuration Protocol (commonly known as "DHCP") are often used, among other purposes, to enable automatic dynamic assignment of an IP address to an IP host. ("Host" in this context merely refers to a computer device that has the capability of communicating with other computers.) A host requesting an IP address using DHCP is referred to as a "DHCP client", and the host which implements the DHCP service and responds to such requests is referred to as a "DHCP server". Similarly, in the BootP protocol the hosts are referred to as "BootP clients" and "BootP servers". The policies and techniques with which the BootP and DHCP protocol implementations manage the assignment of IP addresses to hosts generally differ depending on whether the host is a client or a server. As described above, server addresses are typically statically configured, and constant in value. Thus, the benefits of BootP and DHCP for automatic IP address generation and configuration are therefore not generally available for hosts whose primary function is as a server. Instead, the server's address must be entered into the server manually, and if the server changes to a different physical location then a different address must be entered. (BootP is defined in the Internet Engineering Task Force's Request for Comments (RFC) 951, titled "BOOTSTRAP Protocol (BootP)", and DHCP is defined in RFC 1541, titled "Dynamic Host Configuration Protocol".)

In view of the advantages of using BootP and DHCP, it would be desirable to enable use of these protocols for servers. Currently, if the physical topology of a LAN is changed, IP addresses of servers previously connected to segments of the changed topology may be no longer valid, and routers will then be unable to route traffic to those invalid addresses. The IP addresses of affected servers must first be changed in the DNS mapping, concurrently with reconfiguring each such server to use its new address. Typically, the reconfiguration of the server is a manual process, and the DNS update may sometimes be a manual process as well. If BootP or DHCP were available for dynamic address assignment to a server when a topology change occurred, this would enable significant improvements in the ability to centrally manage an IP network. For example, the BootP or DHCP service could dynamically manage which P addresses are associated with segments of the physical network, without needing to closely synchronize this activity with the physical location of computers acting in a server role, and without requiring these computers to be reconfigured concurrently with changes to the physical topology. The need for such improvements is compounded by the fact that enterprises (that is, large-scale computing installations and/or computing networks) are moving away from a centralized computing model to a highly distributed model of application deployment. As this move towards distributed computing progresses, more and more systems in the corporate network will take on the capability of performing in a server role. In the absence of automated IP address generation and management (such as that provided by BootP and DHCP), extra effort will be required to administer and manage the IP addresses for this increasing number of servers.

It would be advantageous to dynamically and automatically assign (e.g. using BootP or DHCP) an IP address to a host acting in a server role, such that the server's IP address would reflect the current IP address definition associated with its host name in the DNS hostname-to-address mapping. Some implementations of this technique are already in practice. However, these known techniques are deficient because of their inability for the network management component to know for sure what device is requesting an IP address assignment. These techniques do not have the capability of preventing a malicious third party from attaching to the network and masquerading as a host that is currently off-line (and is therefore not using its assigned IP address). This deficiency leaves such implementations vulnerable to the masquerading attack. Exploring this scenario in more detail, it would be possible for a malicious individual to program a different computer to simulate the functions of the host under attack, and then to cause a loss of power or a network disconnection such that the original host becomes disconnected or fails, and finally to enable the new (attacking) host to contact a BootP or DHCP server and impersonate the original host. Once an attacking host obtains the DNS identity of the original host by substituting its own IP address into the DNS mapping for the original host's name, the attacking host is then in a position to perform any number of security attacks (such as a Trojan horse attack, a denial-of-service attack, passing programs containing viruses or other harmful software to users, etc.). Or, the masquerading host could attempt to steal secrets (such as user identification, passwords, and/or private personal data) from users who log on to the masquerading host believing it to be the original host.

Given the current state of the art, it is also easy for an attacker to set up a fake DHCP service (or, similarly, a fake BootP service)—that is, one where the masquerading host assumes the responsibility for, inter alia, assigning IP addresses—thereby opening up an array of additional attacks by which the attacker actually assumes the identity of its victim server host, while the victim is still running. Current art does not provide any way for a DHCP server, before assigning an IP address, to distinguish an authentic requesting host from an attacker. Nor does it provide a means for a requesting host (i.e. a DHCP client) to know that the DHCP server from which it requests an IP address is a true source of valid configuration information. While there have been some suggestions of ways a DHCP server could authenticate a requesting host, such as via a user identification and password transmitted in a HyperText Transfer Protocol (HTTP) flow—which might be protected from third-party tampering using a secure communications exchange such as that provided by the Secure Sockets Layer (SSL) protocol—heretofore all known proposals have involved some kind of authentication occurring above the physical device level.

Accordingly, what is needed is a technique with which the above-described inadequacies in the current art can be overcome.

SUMMARY OF THE INVENTION

An object of the present invention is to provide a technique for enabling devices functioning as servers in a network to participate in automatic address assignment mechanisms.

Object of the present invention is to provide this technique in a manner that enables the server requesting an automatically assigned address to be authenticated before assigning an address thereto.

Yet another object of the present invention is to provide this technique whereby the source of an automatically assigned address can be authenticated before the address is used by a server.

Still another object of the present invention is to provide this technique using authentication between pairs of devices at the physical level.

A further object of the present invention is to provide this technique by using a digital certificate and a public/private key pair for a device, where the device is uniquely identified by a device identifier stored in the certificate.

Yet another object of the present invention is to provide a technique for automated authentication of communicating devices, whereby a particular device is authenticated using its device certificate.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, one embodiment of the present invention provides a method, system, and computer program product for using device certificates for automated authentication of communicating devices. In one embodiment, this technique comprises: creating a public key, private key pair for a first device, this key pair adapted for use in public key cryptography systems; creating a first device certificate for the first device, wherein the first device certificate identifies the first device using a device identifier associated with a network adapter card directly attached to the first device; storing the public key in the first device certificate; securely storing the private key on the first device; sending a first message from the first device to a second device; receiving the first message at the second device; authenticating, by the second device, the first device; processing the first message if the authentication determines that the first device is authentic, resulting in creation of a second message; returning the second message from the second device to the first device if the authentication determines that the first device is authentic; and receiving the returned second message at the first device.

Sending the first message may further comprise: digitally signing, by the first device, one or more fields of the first message wherein the one or more fields includes at least the address identifying the first device, using the private key and resulting in creation of a first digital signature; and sending, along with the first message, the first digital signature and the first device certificate. Receiving the first message may further comprise receiving the first digital signature and the first device certificate, in addition to the first message. Authenticating the first device may further comprise: decrypting the received first digital signature using the public key stored the first device certificate; obtaining a certificate authority (CA) public key associated with a CA which created a second digital signature stored in the first device certificate; decrypting the second digital signature using the obtained CA public key; concluding that the first device certificate is authentic if the decrypted second digital signature is authentic; and concluding that the first device is authentic if (1) the decrypted first digital signature is authentic, (2) a device identifier value represented by the decrypted first digital signature matches the address associated with the network adapter card of said first device, and (3) the first device certificate is authentic.

Processing the first message may further comprise digitally signing, by the second device, one or more fields of the resulting second message, using a second private key associated with the second device and resulting in creation of a third digital signature. Returning the second message may further comprise returning, along with the second message: (1) a second device certificate, wherein the second device certificate comprises (a) a second device identifier associated with the second device and (b) a second public key, the second public key associated with the second private key and adapted for use in public key cryptography systems, and (2) the third digital signature. Receiving the returned second message at the first device may also receive the second device certificate and the third digital signature. This technique may also further comprise: decrypting, by the first device, the received third digital signature using the second public key stored in the received second device certificate; obtaining, by the first device, a second CA public key associated with a second CA which created a fourth digital signature stored in the second device certificate; decrypting, by the first device, the fourth digital signature using the obtained second CA public key; concluding that the second device certificate is authentic if the decrypted fourth digital signature is authentic; concluding that the second device is authentic if (1) the decrypted third digital signature is authentic, (2) a third device identifier value represented by the decrypted third digital signature matches the second device identifier, and (3) the second device certificate is authentic; and using the received second message at the first device only if the second device is authentic.

Sending the first message, the first digital signature, and the first device certificate may also send a CA certificate containing the CA public key to the second device using a copy of the CA certificate stored at the first device. In this case, obtaining the CA public key uses the sent CA certificate.

Returning the second message, the second device certificate, and the third digital signature may also return a second CA certificate containing the second CA public key to the first device using a second device copy of the second CA certificate. In this case, obtaining the second CA public key uses the returned CA certificate.

This technique may further comprise: creating a handshaking message by the first device, wherein the handshaking message comprises one or more message fields and a fourth digital signature, wherein the one or more message fields include a time stamp, the fourth digital signature computed over the one or more message fields; sending the handshaking message from the first device to the second device; receiving the handshaking message at the second device; decrypting the fourth digital signature using the public key of the first device; and completing a message exchange initiated by the first message and the second message if the decrypted sixth digital signature is valid and the time stamp is not stale.

Securely storing the private key may store the private key in a write-only memory of the first device, the write-only memory having an ability to perform computations using data values previously stored therein. Or, securely storing the private key might store private key in a read-write memory of the first device, the read-write memory being readable only by means of a shared secret key.

The address identifying the first device in the first device certificate may be a medium access control (MAC) address of the network adapter card.

The technique may further comprise: generating, by the first device, a first challenge; including, by the first device, this first challenge in said one or more fields of the first message; and including, by the second device, the first challenge in said one or more fields of the second message. In this case, using the received second message further comprises using the received second message only if the signed first challenge is valid.

Or, the technique may further comprise: generating, by the first device, a first challenge; including, by the first device, this first challenge in the one or more fields of the first message; generating, by the second device, a second challenge; including the first challenge and the second challenge in the one or more fields of the second message; and including, by the first device, the second challenge in the one or more message fields of the handshaking message. In this case, using the received second message further comprises using the received second message only if the signed first challenge is valid, and completing the message exchange further comprises completing the message exchange only if the signed second challenge is valid.

In another embodiment, this technique comprises: creating a public key, private key pair for a device that will function as a server device, the key pair adapted for use in public key cryptography systems; creating a device certificate for the server device, wherein the device certificate identifies the server device using a device identifier associated with a network adapter card directly attached to the server device; storing the public key in the device certificate; securely storing the private key on the device; sending a first message from a client device to the server device; receiving the first message at the server device; processing, by the server device, the first message, resulting in creation of a second message; returning the second message to the client device; receiving the returned second message at the client device; authenticating the server device; and using the received second message if the authentication determines that the server device is authentic.

Returning the second message may further comprise: digitally signing, by the server device, one or more fields of the second message, using the private key, resulting in creation of a first digital signature; and returning, along with the second message: (1) the device certificate and (2) the first digital signature. Receiving the returned second message at the client device may also receive the device certificate and the first digital signature. Authenticating may further comprise: decrypting, by the client device, the received first digital signature using the public key stored in the received device certificate; obtaining, by the client device, a certificate authority (CA) public key associated with a CA which created a second digital signature stored in the device certificate; decrypting, by the client device, the second digital signature using the obtained CA public key; concluding that the device certificate is authentic if the decrypted second digital signature is authentic; and concluding that the server device is authentic if (1) the decrypted first digital signature is authentic, (2) a device identifier value represented by the decrypted first digital signature matches the server device address, and (3) the device certificate is authentic.

In this embodiment, the server device may be executing a Dynamic Host Configuration—Protocol (DHCP) service, or it might be executing a Domain Name System (DNS) service.

The present invention will now be described with reference to the following drawings, in which like reference numbers denote the same element throughout.

BRIEF DESCRIPTION OF THE DRAWINGS

FIG. 3 depicts the format of a digital certificate that may be used with the preferred embodiments of the present invention;

FIGS. 5A through 5C illustrate the relevant information conveyed in a message exchange for requesting (or conveying) configuration information between two paired devices, using the techniques of the present invention.

DESCRIPTION OF THE PREFERRED EMBODIMENTS

Figure 1A:
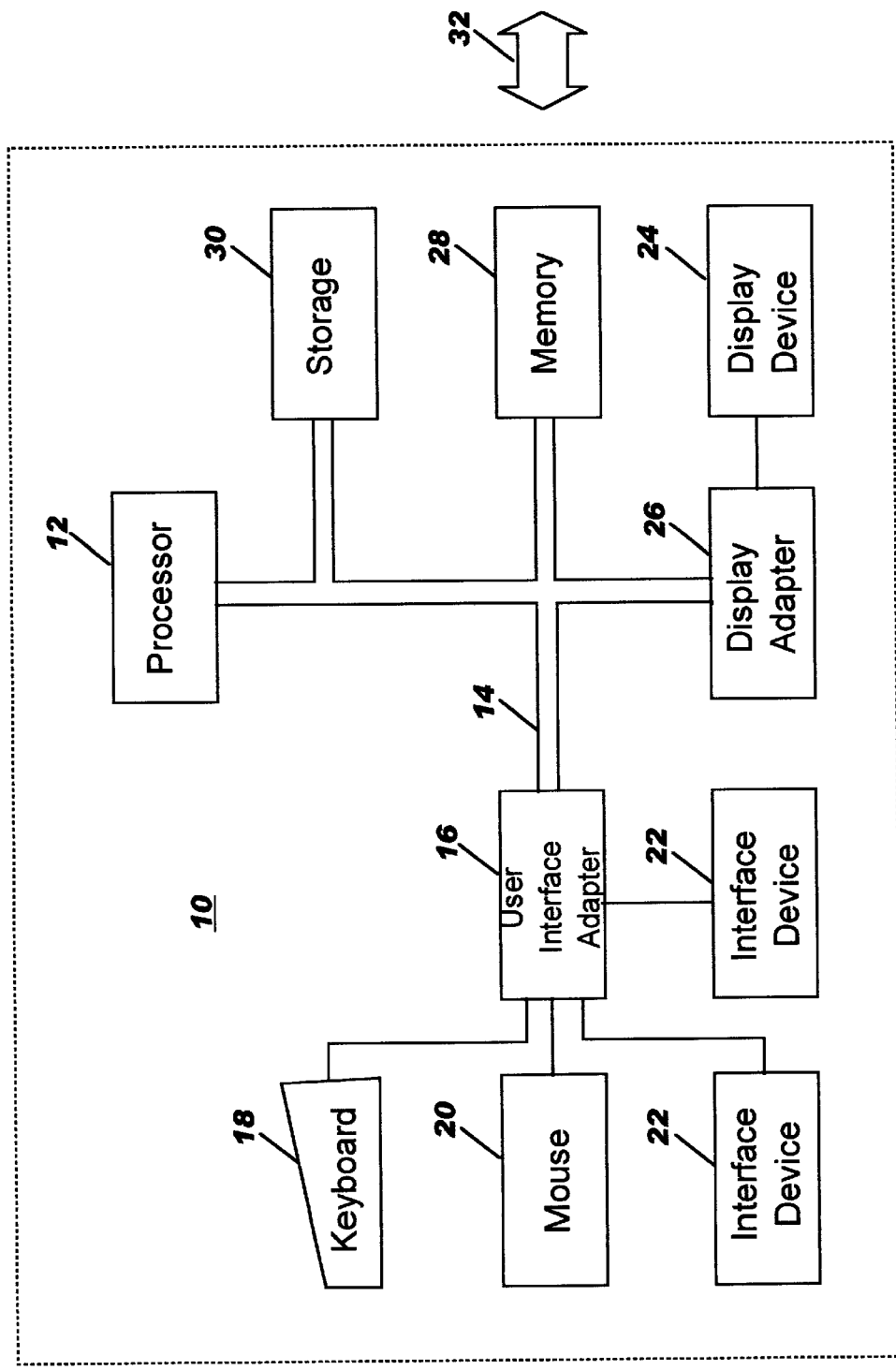
FIG. 1A is a block diagram of a computer workstation environment in which the present invention may be practiced.

FIG. 1A illustrates a representative workstation hardware environment in which the present invention may be practiced. The environment of FIG. 1A comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. When communicating using a LAN, an appropriate adapter card or interface device 32 (see FIG. 1B), such as an Ethernet or Token Ring card, is used for data transmission. All of these configurations, as well as the appropriate communications hardware and software, are known in the art.

Figure 1B:
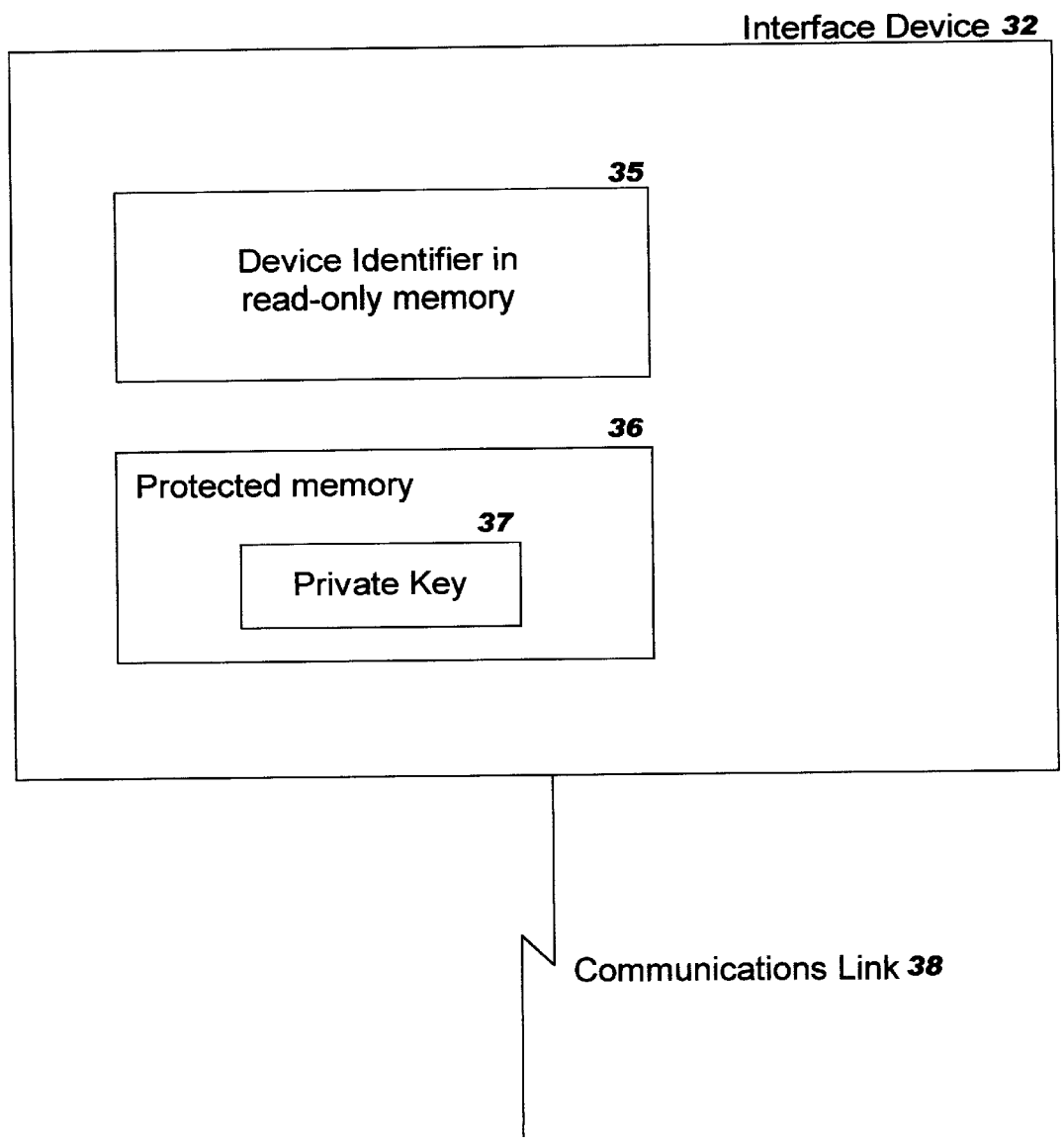
FIG. 1B depicts a block diagram of an interface device with which a computer workstation communicates with other computing devices over a network, where this interface device has been augmented as required by the present invention.

FIG. 1B illustrates a representative interface device 32 with which a computer workstation 10 may communicate with other computer devices over a network. Such interface device, and the manner in which such devices operate, are well known in the art. A globally unique identifier of the interface device 32 (such as a medium access control, or "MAC", address) is stored in read-only memory 35 of the device 32. Data is sent and received over a communications link 38, which in the preferred embodiments is a LAN connection. Interface device 32 has also been augmented with additional features, as required by the present invention. As shown at 36, device 32 requires a protected storage or memory element. This protected storage 36 is used to securely store a private key 37 associated with dice 32. This protected storage 36 and private key 37 will be described in more detail below.

Figure 2:
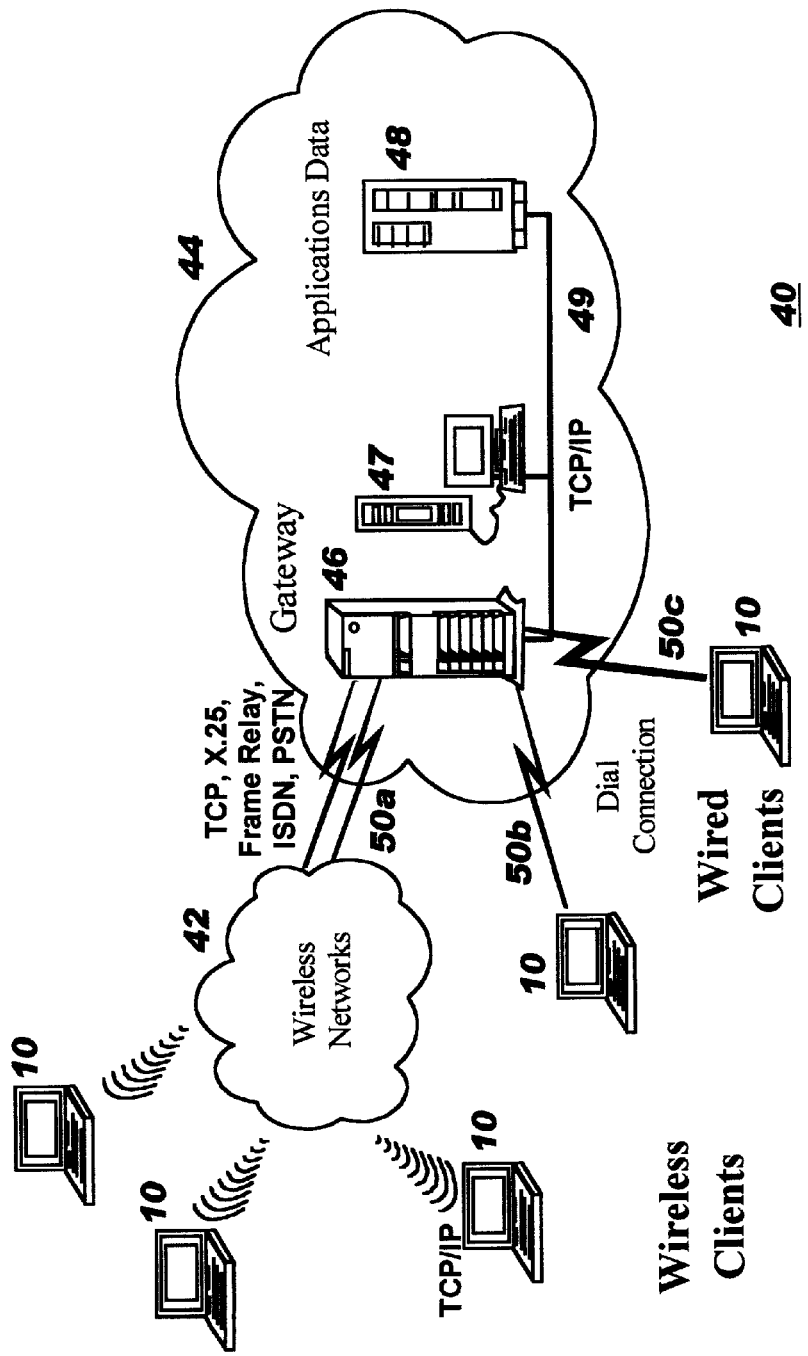
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly coupled to one or more workstations 10 using a communications link 50b, 50c, or may be indirectly coupled to such workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

User of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The To remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

The present invention defines a novel technique for authenticating devices at the physical level in a pairing situation, such as pairing a host server with a DHCP server where the host server will request an automatic address assignment from a DHCP service operating on the DHCP server. "Pairing" in this context refers to creating a trusted security relationship between two devices. (While the discussions herein are in terms of using IP networks, servers, DNS, and the BootP and/or DHCP protocols, it is to be understood that these specific technologies are used by way of illustration and not of limitation.) Performing authentication at the physical level, in contrast to prior art techniques, makes it much more difficult to compromise the security of the device (and therefore much more difficult for an attacker to successfully perform a valid authentication procedure). Rather than merely altering the software used by a device to compromise the device's security (as would be possible with an authentication procedure performed at a level above the physical level), with the present invention's physical level authentication technique the attacker would have to alter the logic executing in the protected storage (to be described below) or physically remove the adapter card from one computer and install it in a different computer, which is a much more difficult undertaking.

Specifically, the present invention teaches creating device certificates using a globally-unique device identifier for a particular device, storing the private key associated with the device certificate for a device in non-removable protected storage attached to that physical device, and then using the device signature (a computation performed by the protected memory using its resident private key) during automatic address assignment procedures to protect against a number of security exposures (such as the masquerading attacks which have been described). The device certificate and the public/private key pair enable creation of digital signatures by the device, which can be used by receivers of messages from the device to authenticate the origin of the messages. (In addition to using a device certificate during an address assignment process, the techniques of the present invention may be used advantageously for any message exchange where it is desirable to authenticate one or more of the communicating parties at the physical device level, as will be described below in more detail.)

As is well known in the art, certificates and public/private key pairs may be used with public key cryptography systems to protect the confidentiality of data, and to ensure that the party purporting to have created the data is in fact the true creator. A participant in a public key system has a key pair that consists of a private key and a public key, both keys being used to encrypt and decrypt messages. The private key is never to be divulged or used by any party but the owner. The public key, on the other hand, is available to any party who needs to use it. As an example of using the key pair for encrypting a message, the originator of a message encrypts the message using the receiver's public key. The receiver then decrypts the message with his private key. The algorithm and the public key used to encrypt a message can be exposed without comprising the security of the encrypted message, as only the holder of the associated private key will be able to successfully decrypt the message. A key pair can also be used to authenticate, or establish the identity of, a message originator. To use a key pair for authentication, the message originator digitally signs the message (or a digest thereof) using his own private key. The receiver decrypts the digital signature using the sender's public key. By comparing the original data to the decrypted digital signature, the receiver can determine whether the data is authentic and can verify the signer's identity.

A common means of publishing a public key to be used for a particular receiver is in a digital certificate, also known as a "digital identity". U.S. patent application Ser. No. 09/316,805, filed May 21, 1999, titled "Method and Apparatus for Efficiently Initializing Secure Communications Among Wireless Devices", along with its related U.S. patent application Ser. Nos. 09/316,804 and 09/316,696, also filed May 21, 1999 and titled "Method and Apparatus for Initializing Mobile Wireless Devices" and "Method and Apparatus for Exclusively Pairing Wireless Devices", now U.S. Pat. No. 6,772,331 respectively, which are assigned to the assignee of the present invention, disclose using a digital certificate to identify and represent a device. (These three inventions will be referred to hereinafter as "the related inventions".) The present invention also uses digital certificates to identify and represent physical devices, as will be described in detail herein.

FIG. 3 depicts the format of a representative digital certificate that may be used for a device according to the preferred embodiment (although other types of digital certificates may be used without deviating from the inventive concepts of the present invention). The certificate 300 has a number of fields, the use of which is well known in the art. According to the present invention, the unique device identifier of interface device 32 (which is retrieved from its storage location in read-only memory 35 of device 32) is stored in the subject field 310, and the public key for the device is stored in field 315. The identity of the creator of device certificate 300 is stored in the issuer field 305, and a digital signature of the certificate 300 (created by the issuer 305) is stored in the certificate signature field 325. (Note that the order of fields shown within certificate 300 is merely illustrative.)

In one aspect of the present invention, the device certificate 300 also includes capability indicators 320. Preferably, these capability indicators 320 will comprise an address provider flag 321 and a DNS server flag 322. These capability indicators are used to prevent devices from masquerading as legitimate address providers and DNS servers, respectively. According to the embodiments, in a device certificate for a device functioning as a client, these flags 321, 322 will have the binary value "00". For a device that is authorized to function as an address provider, such as a BootP server or DHCP server, flag 321 will have the binary value "1". For a device that is an authorized DNS server, flag 322 will have the binary value "1". It may be possible for both flags 321 and 322 to be set to "1" in particular situations. Additional capability flags may be added to the capability indicators field 320 for other services for which secure access is needed.

The protected storage in which the device's private key is securely stored may be a write-only memory (see elements 36, 37 of FIG. 1B), such that previously-stored data values in this memory cannot be read by device-resident software but the device can execute operations on the stored values using instructions implemented in the device's hardware or firmware. In particular, the preferred embodiment of the present invention computes digital signatures using the device's previously-stored private key 37 using this approach. Alternatively, the protected storage 36 may be a read-write memory, where read access is available only by means of a shared secret key.

The related patents disclose using a serial number or other identifier of a radio module contained in a wireless device that will communicate using radio frequency to authenticate the device. This identifier is stored in a device certificate, which is used to authenticate the device when it communicates with other such devices. This authentication procedure makes use of public key cryptography, using a securely-stored private key associated with the device certificate. These related inventions are incorporated herein by reference.

The present invention defines an extension to the techniques disclosed in these related inventions, whereby a device serial number (or equivalent identifier) bound to a specific network interface adapter of the device is used as a unique device identifier in authenticating a device without regard to whether the device has a radio module contained therein and without regard to whether the device is to be used in wireless communications or in wireline communications. In one embodiment, the present invention also defines novel techniques whereby devices performing in the role of a server can be authenticated before assignment of an IP address (or semantically-equivalent network address) thereto. This authentication process comprises using the device's certificate and the device identifier stored therein, and the device's securely stored private key, to generate a digital signature for an address assignment request (where this request may be sent to, e.g. a BootP or DHCP server). The device's certificate and public key can then be used to authenticate that the address assignment request using a particular host name actually came from the physical device which possesses the private key used to sign the request. Using the techniques of the present invention, impersonating a server host is much more difficult than when using current technology (which only requires learning the server's host name to receive an address assignment for, and then to maliciously impersonate, a particular host).

In another embodiment of the present invention, a device requesting an address may also authenticate the address provider (such as a DHCP or BootP server, or a DNS server) before accepting the provided address as legitimate. This makes it much more difficult for an attacker to masquerade as a valid source of assigned addresses, and to perform various types of attacks (such as misdirecting clients or servers to use improper addresses, sending corrupted data to a server which has requested an address assignment, etc.) in its assumed role. This embodiment may be used independently from the previously-described embodiment, or in combination with the previously-described embodiment. As an example of when the former scenario will be advantageous, a client may request retrieval of an already-assigned server address as it prepares to communicate with that server. Authenticating the entity that retrieves and returns the address will help to ensure that the client communicates with the legitimate target server. An example of when the latter scenario, which provides mutual authentication of communicating parties, will be advantageous is when a DHCP client that will function as a server requests dynamic assignment of an address from a DHCP server. By authenticating the DHCP client, the DHCP server knows that the host name and/or MAC address for which it is returning an address is the legitimate owner of that host name and/or MAC address. And by authenticating the DHCP server, the DHCP client knows that the address it receives is a legitimate address.

In yet another embodiment, the techniques of the present invention enable devices communicating without regard to a specific type of transaction to establish a trusted relationship through automated authentication of one or both parties in the message exchange. For example, suppose a first device transmits its configuration parameter data to a directory server for central storage. In this example, the directory server may wish to authenticate the first device before storing (and perhaps subsequently distributing) the received information. As second example, a first device may request retrieval of information from a second device on which a database system is executing. In this second example, it may be desirable for the requesting first device to authenticate the second device before accepting the returned information as legitimate. As yet another example, if a database server or directory service has stored information for which access is limited, it may be desirable to perform mutual authentication of the parties before any data is returned to, and accepted by, a requesting device.

Figure 4:
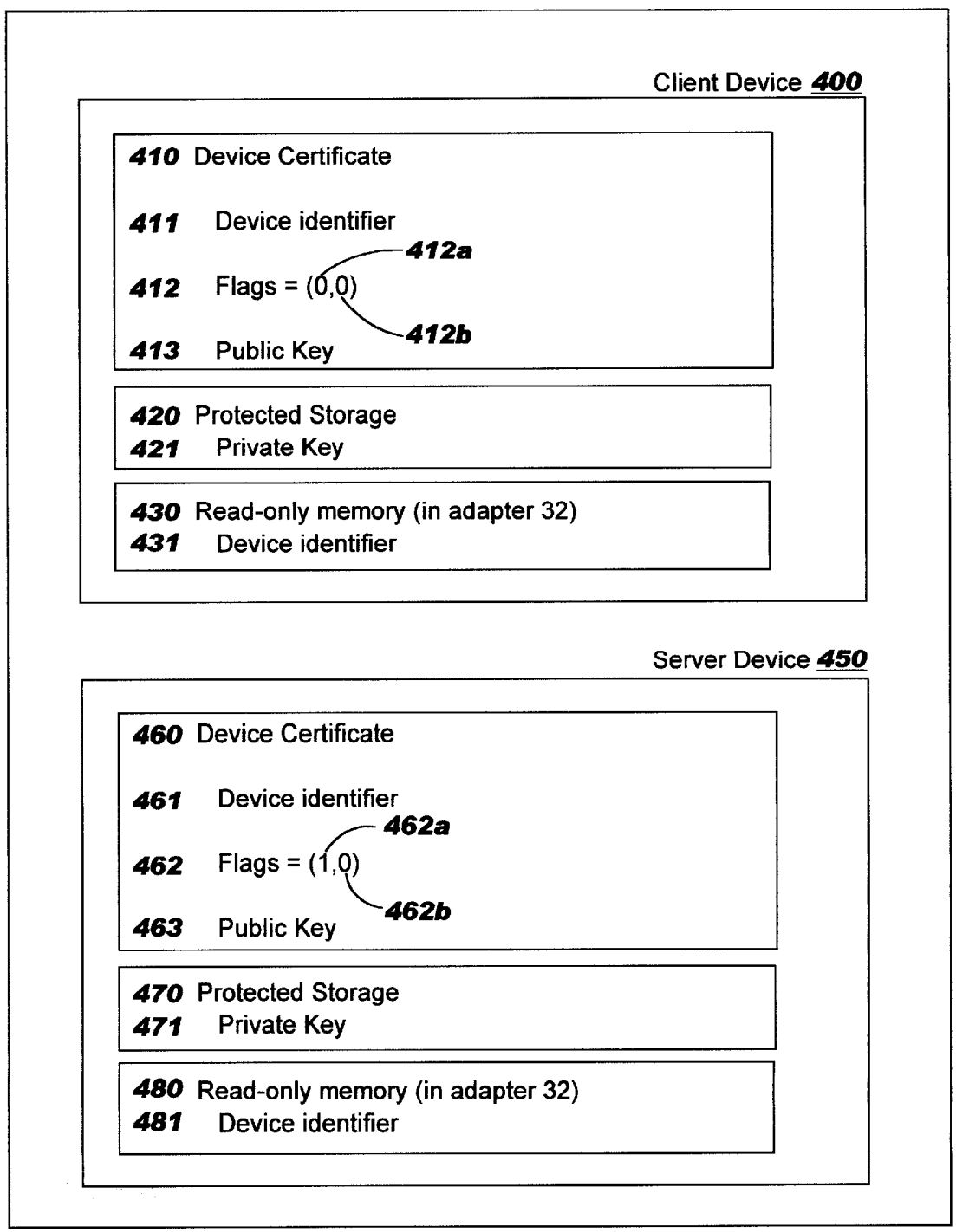
FIG. 4 depicts, at an abstract level, the relevant information used by a preferred embodiment of the present invention for two representative devices.

FIG. 4 depicts, at an abstract level, the relevant information used by the present invention for two representative paired devices. A client device 400 (which may actually function as a server in the distributed computing network, but which operates in the role of a client for tasks such as obtaining its IP address from a DHCP server) has a device certificate 410 stored therein. As discussed with reference to FIG. 3, this device certificate 410 includes a unique identifier 411 representing client device 400, where the value 431 of identifier 411 has been retrieved from a read-only memory 430 of a network interface adapter 32 attached to client device 400. The device certificate 410 also optionally contains capability flags 412, which for this client device are preferably set to the value "00" (as shown at 412a and 412b). A public key 413 is stored in the certificate 410 as well, and is cryptographically associated with (according to public key cryptography techniques) a private key value 421 which is stored in protected storage 420.

Client device 400 and server device 450 communicate, including exchange of their device certificates as appropriate, over communications link or network 38. Server device 450 has a device certificate 460, similar to certificate 410 of client device 400, where the value 481 of the device identifier 461 is the unique identifier which has been retrieved from read-only memory 480 of a network interface adapter 32 attached to server device 450. The server's device certificate 460 also optionally contains capability flags 462, which for this server device are shown as being set to the value "10" (as shown at 462a and 462b) to indicate that this device is an authorized address provider but is not an authorized DNS server. A public key 463 is stored in the certificate 460 as well, where this public key 463 is cryptographically associated with a private key value 471 which is stored in protected storage 470.

If the server's assigned address is to be updated in a domain name system server, then the flows occurring between the entity requesting the update (again, this may be a DHCP or BootP server) and the DNS server may also be authenticated using the disclosed approach. DNS hostname-to-address mapping updates resulting from the attachment of a server to a network are then only allowed if the server has been shown to be authentic. By maintaining the integrity of the DNS mappings in this manner, it is much more unlikely that subsequent service requests from clients—which determine the network address of a target server by accessing the DNS mappings—will be misdirected to masquerading servers.

The manner in which the preferred embodiment of the present invention authenticates a server prior to automatically and dynamically assigning an IP address to the server comprises the following steps:

1) First, the protected storage in which the device's private key will be securely stored must be added to the device's LAN adapter card (or other adapter having data capability). This adapter card must then be physically installed in the server that will use the authentication techniques of the present invention.

2) Secondly, a public key/private key pair and a device certificate must be created for the device. The device certificate includes the unique device identifier (stored as the value of the subject field, or semantically-equivalent field), and the device's public key, as previously described with reference to FIGS. 3 and 4.

The related inventions disclose a technique for dynamically obtaining a device certificate and key pair during initialization of the device by an administration process which contacts a Certificate Authority (CA), and then downloading the data from the CA onto the device containing the radio module with which the certificate and keys are to be associated. Or, the device may generate its own key pair, and send the public key to the administration process which then requests the CA to create and sign the device's certificate with this public embedded in it. These related inventions also state that alternatively, the certificate and key pair may be created during the process of manufacturing the device, and installed in the device before it reaches an end-user. (In this latter situation, it will be obvious that the order of steps 1 and 2 may be reversed.) The techniques disclosed in these related inventions are preferably used for creating and installing the certificate and key pairs used by the present invention, with the unique device identifier being substituted for the radio module identifier. The public key of the CA which created the device's certificate or the certificate of the CA must also be stored in storage that is on, or accessible to, the device so that certificates it receives may be validated by checking CA's signature therein contained. (Alternatively, the issuer field 305 of a device's certificate may be used to dynamically retrieve a certificate for the CA, from which the CA's public key can be obtained although this raises additional authentication requirements not discussed here.)

3) The process with which a server host requests an IP address assignment from an address provider such as a BootP or DHCP server is then augmented to invoke operations on the adapter card to generate a digital signature for the request, using the server device's protected private key as input to digital signature creation techniques which are known in the art. This digital signature, along with the device's certificate (and optionally the CA's certificate or certificate chain), are then included in the communication flow with which the device requests its IP address.

When the present invention is used for message exchanges not involving address assignment requests, and when the "first speaker" (i.e. the party sending the first message of a particular exchange) is to be authenticated, then the process for generating the first message of the appropriate exchange is augmented in this same manner.

To accomplish mutual authentication of the parties during a message exchange (e.g. authentication of a address requester by an address provider, and vice versa, when the message exchange pertains to an address assignment request) and enable both parties to trust that they are communicating with the party they believe themselves to be communicating with, a three-way handshaking protocol exchange is required. The address assignment request message (or other appropriate initial message between the two parties) comprises the first of the three messages exchanged in this handshaking process. A challenge, typically tale the form of a random number, is generated by the party issuing this first message. (Note: It may happen that generating and sending a challenge is already included in the protocol used for the particular message exchange. In this case, it is not necessary to create and use an additional challenge.) This challenge is sent as part of the first message, and will be operated upon by the party receiving the first message (see Step 4, below).

4) The address provider, upon receiving the address assignment request, now validates that the requester is authentic before obtaining and returning the requested address (and L0 before updating the DNS mappings for the requester and/or returning configuration data to the requester). Note that the provider can know that the source of the message is authentic but is not able to tell yet if the message had been recorded in the past by a third party and is being replayed. The provider must wait for a future exchange to gain this level of assurance and hence should not commit state changes until that assurance is gained.

Since the address provider is also to be authenticated, the process with which the assigned address is returned is augmented to invoke operations on the adapter card of the associated device, using the provider's protected private key as input to creating a digital signature for the assigned address. This digital signature and the provider's device certificate (and optionally the public key of the CA which issued the provider's certificate) are then returned to the requester, along with the assigned address. When the present invention is being used for message exchange not involving address assignment requests, and when the second speaker (i.e. the party sending a second message as a response to the first message) is to be authenticated or when replay of first speaker requests needs to be detected, then the process for generating the appropriate response to the first message is augmented in this same manner.

When the three-way handshaking protocol is being used for mutual authentication or when detection of first speaker replay is needed, the second speaker (e.g. the address provider in the address assignment scenario) must sign the challenge which was inserted into the first message by the first speaker, and return this signed challenge with a new challenge to the first speaker as part of the second speaker's response message (which is the second message of the three-way handshaking protocol). When the first speaker receives this signed value, it provides assurance that a previous response is not being replayed by an attacker, and that the response is a true response from the second speaker with which the first speaker believes itself to be communicating. In the preferred embodiments of the present invention, the second speaker's challenge is a time stamp value that is local to the second speaker's machine, computed in such a way as to never be repeated in two different responses, and is covered by the second speaker's signature in the second speaker's response (although equivalently, the second speaker may create a challenge by generating a second random number and including this number in the signed response message). Because the second speaker has not yet determined the authenticity of the first speaker (because a possible playback attack has not yet been ruled out) at this point, any locally-made changes (such as an association between the first speaker's host name and/or MAC address and an IP address assigned by a DHCP server in the address assignment scenario, or requesting a corresponding update at a DNS) resulting from exchange of the first two messages of the three-way handshake must not be committed until the first speaker responds properly with a third message.

5) Upon receiving the second speaker's response, the first speaker must then complete the three-way handshaking protocol. In the preferred embodiments, this comprises returning the second speaker's challenge (a time stamp in the preferred embodiments) value from the first speaker to the second speaker in a signed third message. Upon receiving this signed value in the third message, the second speaker is assured that the first speaker is not an attacker who replayed a previous address assignment request as the first message of the exchange. The second speaker, having established a trusted relationship with the first speaker at this point, may now commit the changes pertinent to the message exchange. (The second speaker may perform additional verifications of the contents of the third message, as will be discussed below with reference to FIG. 9, before considering the relationship to be trusted.)

The manner in which these steps are used in implementing the preferred embodiments of the present invention will now be described in more detail.

FIGS. 5A through 5C illustrate, at an abstract level the relevant information conveyed in a message exchange for requesting (or convey) configuration information between two paired devices, using the techniques of the present invention. FIG. 5A depicts an initial request message 500. This message 500 is sent by the first speaker (referred to hereinafter as the client, such as client 400), and either requests information from a server or conveys information to the server. (Note that while one embodiment of the present invention describes authenticating a host during address assignment procedures, where that host will subsequently function as a server, this host operates in the role of a client during the address assignment request protocols described herein.) Examples of this type of request message 500 are the DISCOVER message of the DHCP protocol, the QUERY message sent to a DNS server, etc. In addition to the exiting message content 510 as defined in the prior art, request message 500 also includes: the requesting client's device identifier 505 (having the value stored at element 431 of FIG. 4); the client's device certificate 515 (see element 410 of FIG. 4); a random number 520 generated by the client; and a digital signature 525. This digital signature 525 is computed by the client using its private key (element 421 of FIG. 4) to sign the contents of fields 505 through 520. (It way happen that the prior art content 510 contains one or more of the fields depicted separately in message 500, such as a device identifier or a random number. In that case, the existing values may be used and need not be repeated in fields such as 505 and 520, in order to optimize processing and avoid duplication. This optional optimization applies similarly to messages 530 and 570.)

FIG. 5B depicts a possible response 530 to the request message 500, where this response is returned from the server to the client. An example of this type of response message 530 is the OFFER message of the DHCP protocol. In addition to the existing message content 540 as defined in the prior art, response message 530 also includes: the server's device identifier 535 (having the value stored at element 481 of FIG. 4); the server's device certificate 545 (see element 460 of FIG. 4); a random number 550; a locally-significant time stamp 555 created by the server; and a digital signature 560. Digital signature 560 is computed by the server using its private key (element 471 of FIG. 4) to sign the contents of fields 535 through 555. According to the present invention, random number 550 should have the same value as field 520 of request message 500, indicating that the server has seen and is responding to the particular message 500; otherwise, the client should discard this response message 530 as untrustworthy.

To enable mutual authentication of communicating parties in a message exchange according to the present invention, a three-way handshaking message 570 may be sent by a client to a server following the sending of request message 500 and receipt of response message 530. This three-way handshaking message 570 is depicted in FIG. 5C. An example of this type of handshaking message 570 is the REQUEST message of the DHCP protocol. In addition to the existing message content 575 as defined in the prior art, handshaking message 570 also includes a time stamp 580 and a digital signature 585 (computed over the values of fields 575 and 580 by the client using its private key 421). According to the present invention, time stamp 580 should have the same value as field 555 of response message 530, indicating that the client has seen and is responding to the particular message 530; otherwise, the server should discard this handshaking message 570 as untrustworthy.

A DHCP DISCOVER message (see message 500) is sent as a broadcast message, and is likely received by multiple servers, according to the prior art. A number of servers may therefore return a DHCP OFFER message (see message 530) to this client. Upon choosing a particular server's response from the set of responses from all responding servers, the client uses a DHCP REQUEST message (see message 570) to confirm which of the offers it accepts. The DHCP REQUEST is also a broadcast message. According to the existing DHCP protocol, any server receiving this DHCP REQUEST which has not been selected then deletes the offered IP address (which has been rejected by the client) from its locally-maintained storage. The server whose offer was accepted will keep the offered IP address, and associate it with the client's host name, assuming that server receives a proper handshaking message from the client. In this context, "proper" means that the handshaking message was received within a specified elapsed time extending from the server's issuance of the DHCP OFFER, and that the current time is within a predetermined elapsed time period from the locally-significant time stamp 555 which the server generated when sending the OFFER response, such that the offer has not gone stale. (If a proper handshaking message is not received, then this server also deletes the offered IP address from its local storage.) This time stamp check also prevents a malicious individual from recording messages and then playing them back at a later time as part of an impersonation attempt; in that event, the time stamp would likely have become stale. (It will be obvious to one of ordinary skill in the art how this approach may be adapted to other address assignment protocols, as well as to other scenarios unrelated to address assignment.)

By including random number 520 in message 500 sent from the client to the server, and then returning this value from the server to the client in response 530 as field 550—along with a digital signature 560 which was computed over fields including the random number 550—the client can have increased confidence in trusting the content of response message 530. Similarly, by sending a time stamp 555 from the server to the client in message 530, and then returning this value as field 580 of message 570—along with digital signature 585 which was computed over fields including the time stamp 580—the server can have increased confidence in trusting the content of handshaking message 570. This thee-way handshaking technique is preferably used for all mutually-authenticated exchanges (with which, for example, the DHCP server may convey additional configuration parameter values to the DHCP client) according to the present invention. As an alternative, the three-way handshaking technique may be used for the initial mutually-authenticated exchange (whereby, for example, a server requests and receives an address assignment): following this initial exchange, security of the subsequent exchanges may be accomplished by using a shared secret key to encrypt the flows, where this key is generated by passing an additional field between the client and server in messages 500 and 530 using key-generation techniques which are known in the art. Or, the client and server could establish a secure session using a protocol such as SSL or Transport Layer Security (which is commonly known as "TLS", and which is a protocol designed as a follow-on replacement for SSL) for the subsequent communications after exchange of messages 500 and 530, using the key-generation technique defined for that protocol.

Note that this three-way handshaking technique is not required in scenarios which are not mutually authenticated, such as that described above where a client requests an address of a destination server from a DNS and only the DNS server authenticates itself.

The manner in which the preferred embodiment of the mutual authentication process of the present invention may be implemented will now be described in more detail with reference to FIGS. 6 through 9. (Note that while these flowcharts refer to creating and processing messages 500, 530, and 570, it is to be understood that these message formats are for purposes of illustration and not of limitation. The order of the fields in the messages may be changed without deviating from the inventive concepts disclosed herein. In addition, fields which have not been shown may be added to these messages without deviating from the scope of the present invention. Furthermore, any references to particular protocols and/or message types within the discussion of these messages are intended as merely illustrative, and other protocols as well as other message types may be used with appropriate adaptation of the described messages.)

Figure 6:
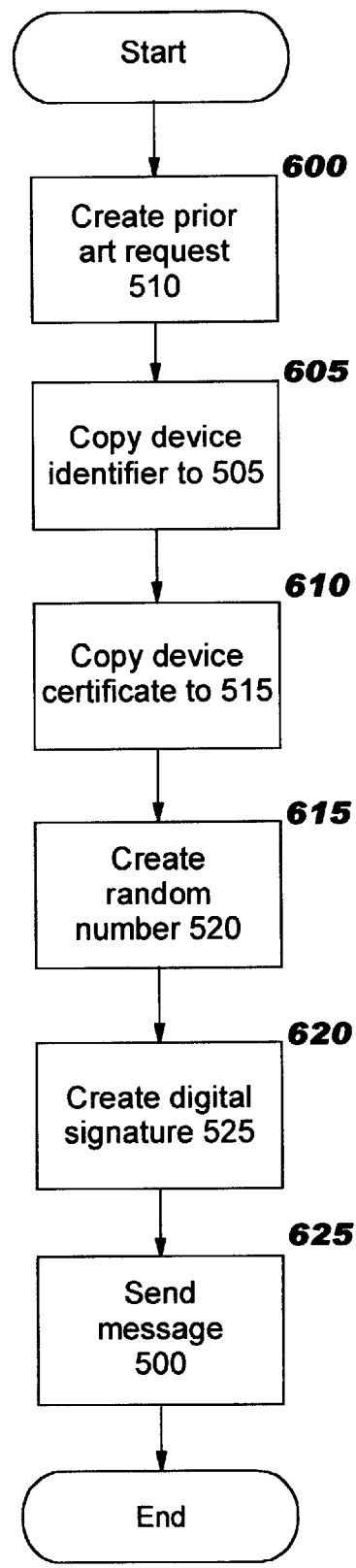
FIGS. 6 through 9 illustrate flow charts depicting the logic with which a preferred embodiment of the present invention may be implemented.

The logic depicted in FIG. 6 is the preferred embodiment of the technique with which a client creates the address assignment request 500 shown ins FIG. 5A, and sends this request message 500 to a server. Block 600 generates an address assignment request, according to the protocol (e.g. BootP or DHCP) being used, as in the prior art, and stores this request in field 510. (In scenarios unrelated to address assignment, the appropriate fist message content is generated by Block 600.) The client's device identifier value 431 is copied from read-only memory 430 to field 505 at Block 605. The client's device certificate 410 is copied to field 515 at Block 610. At Block 615, a random number (of suitable length and properties—which are well known in the art) is then generated (and saved for later use in Block 835 of FIG. 8), using techniques known in the art, and inserted into field 520. At Block 620, the client then digitally signs fields 505, 510, 515, and 520 using its private key 421, and inserts the resulting digital signature into field 525. (Optionally, the certificate of the CA which issued the client's device certificate 410 may also be included in message 500, although this has not been shown in FIG. 6. When this certificate is not sent to the server, the server may obtain the certificate by contacting a registry using the value of the issuer field 305 of the client's device certificate 410.) Request message 500 is then complete, and is sent to the server at Block 625. Note that all parties must validate received certificates by validating their contained signatures reclusively back to a known trusted signer. In the simplest arrangement, all certificates in play come from a single CA and hence each party has a copy of that CA's certificate in a local key chain and hence a copy of the CA's public key which is needed to ver the CA's signature of issued certificates.

Figure 7A:
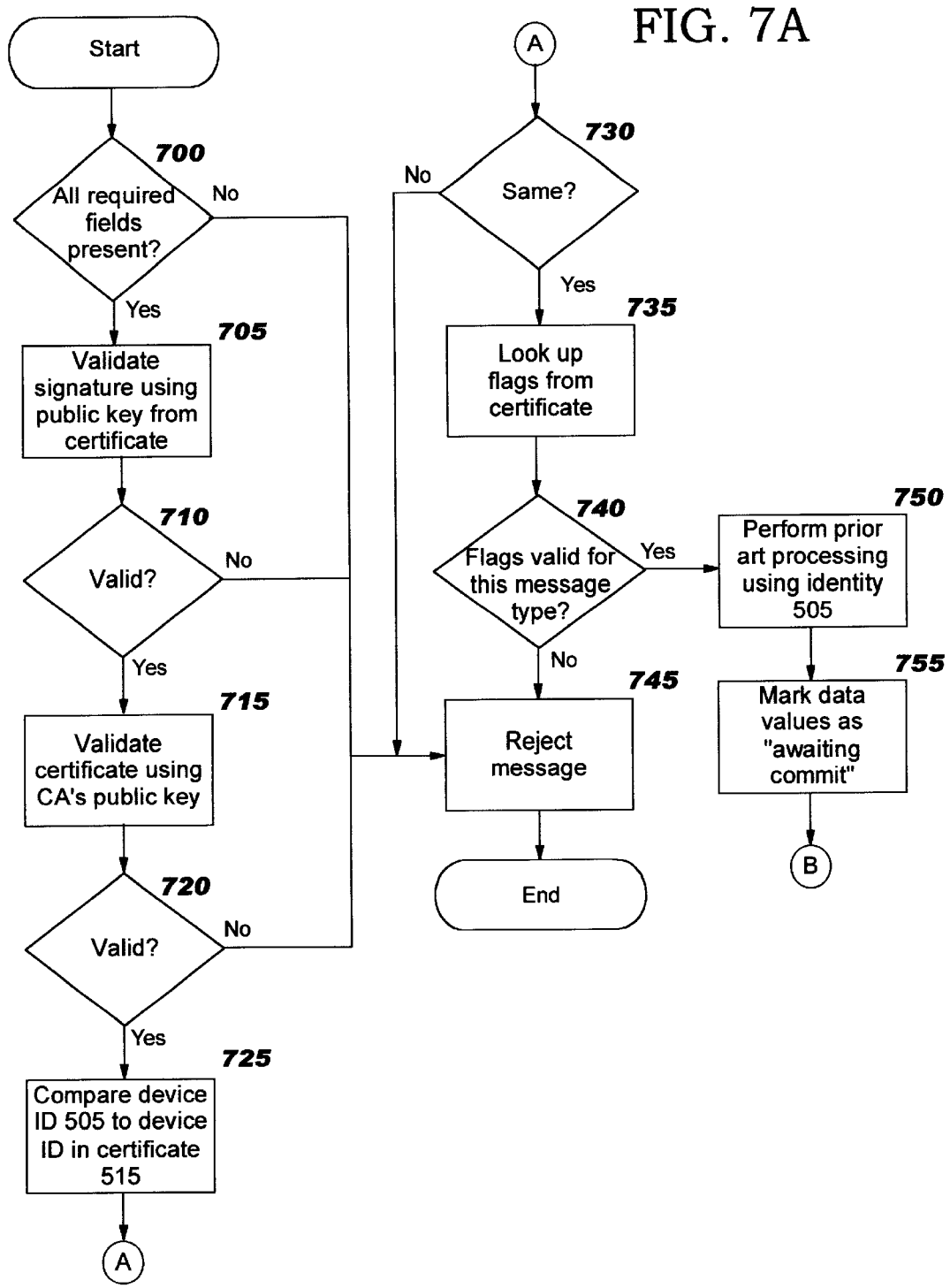
Figure 7B:
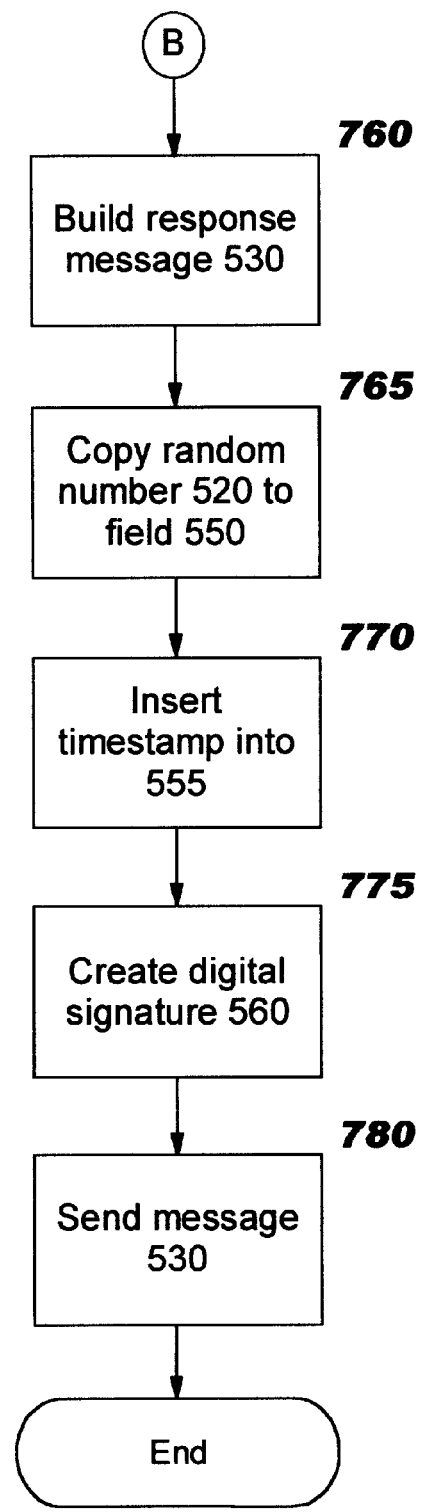

FIGS. 7A and 7B depict the preferred embodiment of the logic with which a server processes request message 500 upon receipt from a client, and generates response message 530. Block 700 checks to see if all required fields of the request message 500 are present. If not, control transfers to Block 745, where the request message 500 is rejected. Otherwise, Block 705 validates the digital signature 525 using the client's public key (which is obtained from field 413 of the device certificate 410, the certificate having been included in the request message 500 as field 515). If the digital signature 525 is not valid, as determined by Block 710 (using techniques which are known in the art), the request message 500 is rejected by transferring control to Block 745. Otherwise, processing continues to Block 715.

Block 715 validates the device certificate 410 using the public key of the CA which created the certificate, using validation techniques which are known in the art. (As stated previously, the CA's certificate may be obtained by using the value from the issuer field 305 to consult a public key registry, or the CA certificate containing this public key any be sent by the client as part of message 500.) If the device certificate 410 is not valid, then Block 720 has a negative result and request message 500 is rejected by transferring control to Block 745. Otherwise, when Block 720 has a positive result, processing continues to Block 725.

Block 725 compares the client device's identifier 505, which was inserted into message 500 by the client (at Block 605 of FIG. 6), to the device identifier value 411 of the device certificate stored in field 515. If these values are the same, Block 730 has a positive result, and processing continues at Block 735; otherwise, control transfers to Block 745 where the message 500 is rejected.

When the optional capability indicators described with reference to FIG. 3 are used, Block 735 retrieves the values 412a, 412b of the capability indicators 412 from the device certificate 410 in field 515, and looks these values up in a local table or other storage mechanism. If the local table indicates that the values 412a, 412b are appropriate settings for the type of request represented by message 500 (e.g. a value of "00" for a DHCP DISCOVER request, which originates from a client and therefore should have neither flag bit set), then Block 740 has a positive result; otherwise, Block 740 has a negative result, and control transfers to Block 745 to reject the message 500.

Block 745 handles the reject processing for a number of error conditions detected by the logic of FIG. 7A. The proper action to be taken depends on the particular message type being processed, and the protocol specification in which that message is defined. In the case of processing a DHCP DISCOVER message, the action to be taken is to ignore the request message, after which the processing of FIG. 7A ends.

Control reaches Block 750 when Block 740 has a positive result. Block 750 processes the request message 500 according to the prior art, using the prior art content 510 and a knowledge of the identity of the requester (as represented in field 505). (For example, in the address assignment request scenario, the DHCP sever may already have a locally-stored address available for requester 505, in which case it may be preferable to assign this address in response to request message 500.) Following the action taken in Block 750, any data values that have been assigned (such as an address that will be offered to the requester) are preferably marked as "awaiting commits" by Block 755.

Continuing to Block 760 of FIG. 7B, the server builds the response message 530. This comprises copying the server device's identifier 481 from read-only memory 480 to field 535, copying the server's device certificate 460 to field 545, and inserting the prior art content of the appropriate response into field 540. At Block 765, the random number 520 from request message 500 is copied to field 550. Block 770 creates a locally-significant time stamp, which is preferably based on the server device's local clock, and inserts this value into field 555. At Block 775, the server then digitally signs fields 535, 540, 545, 550, and 555 using its private key 471, and inserts the resulting digital signature into field 560. (Optionally, the certificate of the CA which issued the server's device certificate 460 may also be included in message 530, although this has not been shown in FIG. 7. When this certificate is not sent to the client, the client may obtain the certificate by contacting a registry using the value of the issuer field 305 of the server's device certificate 460.) Response message 530 is then complete, and is sent to the client at Block 780.

Figure 8A:
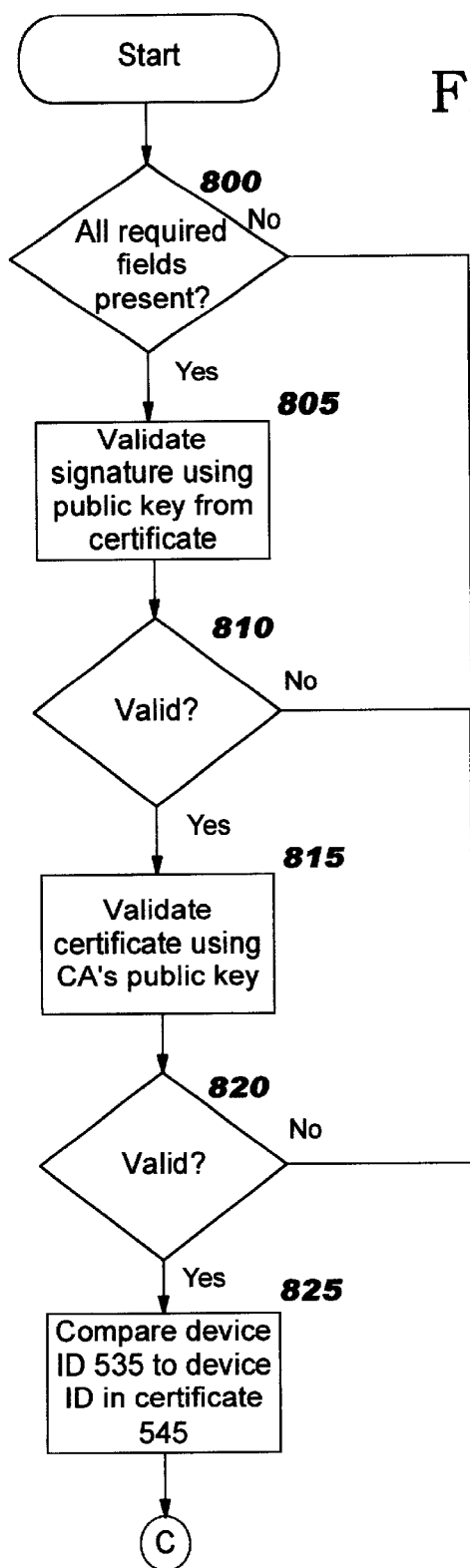
Figure 8A:
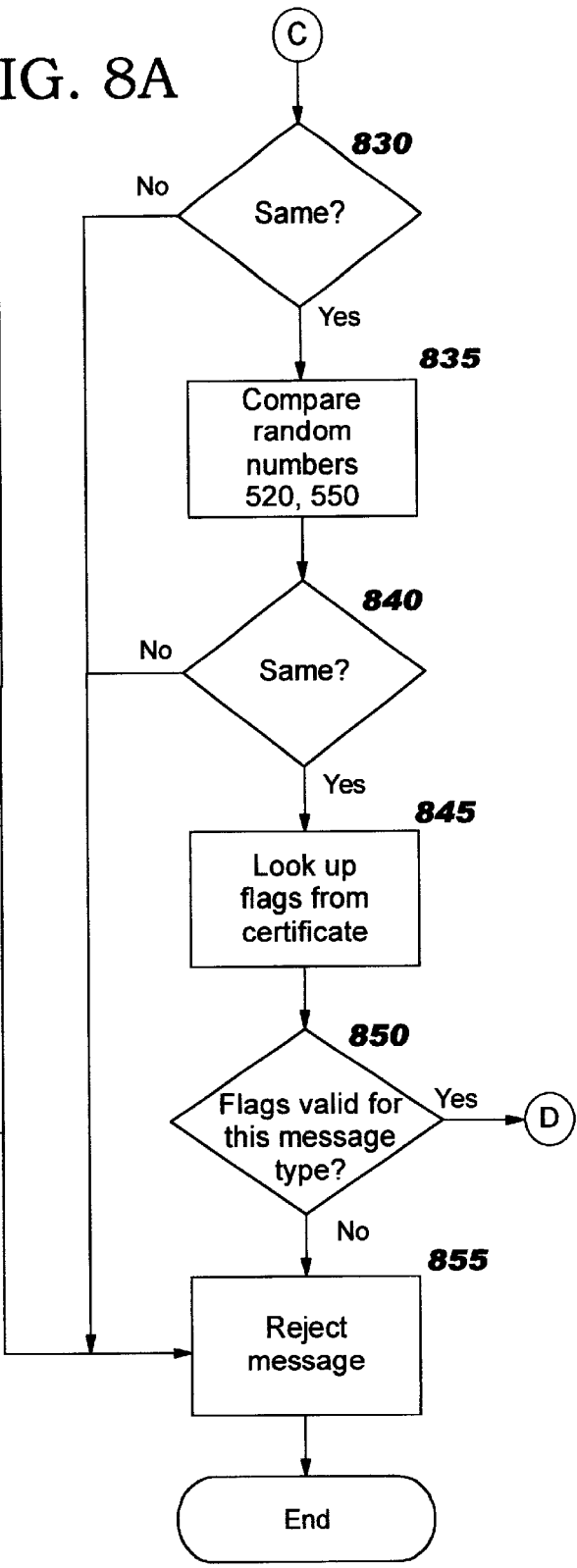

FIGS. 8A and B depict the preferred embodiment, of the logic with which the client processes a server's response message 530, and sends a three-way handshaking, message 570. Beginning at Block 800, the client checks to see if all required fields of the response message 530 are present. If not, control transfers to Block 855 to reject the response. Otherwise, Block 805 validates the digital signature 560 using the server's public key (which is obtained from field 463 of the device certificate 460, the certificate having been included in the response message 530 as field 545). If the digital signature 560 is not valid, as determined by Block 810 (using techniques which are known in the art), the response message 530 is rejected by transferring control to Block 855. Otherwise, processing continues to Block 815.

Block 815 validates the device certificate 460 using the public key of the CA which created the certificate using validation techniques which are known in the art. (As has been stated, the CA's public key may be obtained by using the value from the issuer field 305 to consult a certificate registry, or the CA certificate containing this public key may be sent by the server as part of message 530.) If the device certificate 460 is not valid, then Block 820 has a negative result and response message 530 is rejected by tong control to Block 855. Otherwise, when Block 820 has a positive result, processing continues to Block 825.

Block 825 compares the server device's identifier 535 to the device identifier value 461 of the device certificate stored in field 545. If these values are the same, Block 830 has a positive result, and processing continues at Block 835; otherwise, control transfers to Block 855 where the message 530 is rejected.

At Block 835, the client compares the random number 550 with the random number it previously created during Block 615 of FIG. 6. Block 840 asks whether the compared values were the same. If not, then this is not a trustworthy response, and it will be rejected by transferring control to Block 855. Otherwise, processing continues at Block 845.

When the optional capability indicators are used, Block 845 retrieves the values 462a, 462b of the capability indicators 462 from the device certificate 460 in field 545, and looks these values up in a local table or other storage mechanism. If the local table indicates that the values 462a, 462b are appropriate settings for the type of request represented by message 530 (e.g. a value of "10" for a DHCP OFFER request, which indicates that a DHCP server is authorized to assign addresses), then Block 850 has a positive result; otherwise, Block 850 has a negative result, and control transfers to Block 855 to reject the message 530.

Block 855 handles the reject processing for a number of error conditions detected by the logic of FIG. 8A. As in the case of FIG. 7A, the proper action to be taken when rejecting a message depends on the particular message type being processed, and the protocol specification in which that message is defined. Following this implementation-specific reject procedure, the processing of FIG. 8A ends.

Figure 8B:
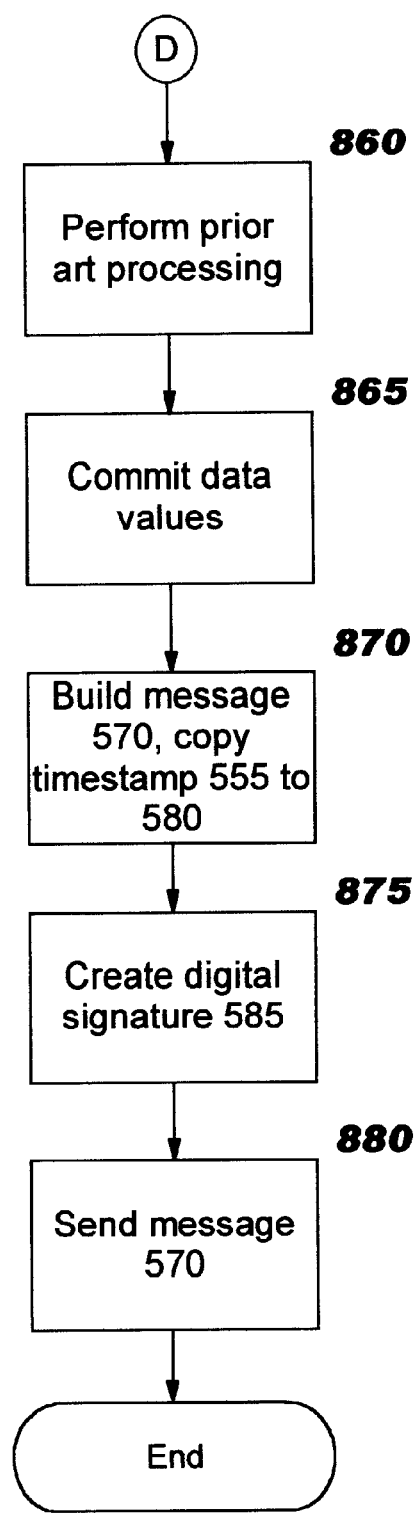

Control reaches Block 860 of FIG. 8B when Block 850 has a positive result Block 860 processes the response message 530 according to the prior art, using the prior art content 540. The client then commits (Bock 865) the data values associated with this processing, based on its authenticated knowledge of the sever's identity and role (e.g. as a legitimate address provider). For example, the client may commit the offered IP address from a DHCP OFFER message 530.

At Block 870, the client builds the three-way handshaking message 570. This comprises inserting the prior art content of the appropriate handshaking message into field 575, and copying the time stamp value 555 from response message 530 to field 580 of the handshaking message 570. At Block 875, the client then digitally signs fields 575 and 580 using its private key 421, and inserts the resulting digital signature into field 585. The handshaking message 570 is then complete, and is sent to the server at Block 880.

Figure 9:
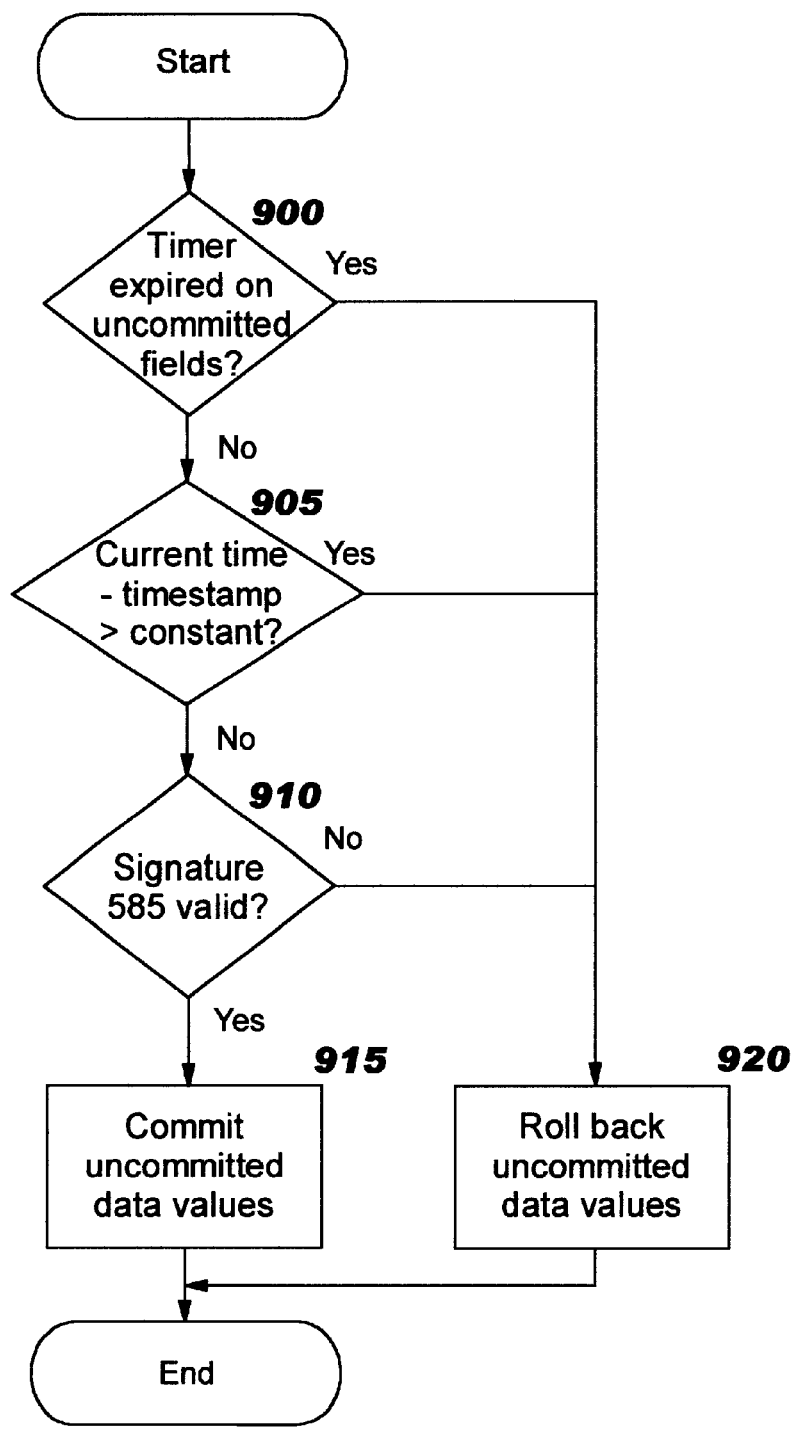

FIG. 9 depicts the preferred embodiment of the logic that may be used when the server receives the three-way handshaking message 570. Block 900 checks to see if the server's timer for uncommitted data fields has expired. If so, control transfers to Block 920. Otherwise, Block 905 then checks to see if the server's local time (as may be represented by its local clock) minus the value of the time stamp 555 (or 580, equivalently) is greater than a predetermined constant value, where this value represents a time period after which the server's offered data value(s) (such as an IP address) go stale. If Block 905 has a positive result, indicating that the offer is stale, control transfers to Block 920.

When Block 905 has a negative result, Block 910 tests whether the digital signature 585 is valid using the client's public key (which the server has preferably retained during the processing of FIG. 7). If the signature is not valid, control transfers to Block 920; otherwise, processing continues at Block 915 where the uncommitted data values related to the client's request in message 500, the server's offer in message 530, and the client's handshaking request in message 570 are committed. The processing of FIG. 9 then ends. If control reaches Block 920, however, then these uncommitted data values are rolled back, after which the processing of FIG. 9 also ends.

It will be obvious to one of skill in the art how the processes depicted in FIG. 6 through 9 may be adapted to messages exchanged between an address provider (e.g. a BootP or DHCP server) and a DNS server. Similarly, it will be obvious how these processes may be adapted to the situation where only one party is to be authenticated.

While the preferred embodiments of the present invention have been described, additional variations and modifications in those embodiments may occur to those skilled in the art once they learn of the basic inventive concepts. For example, the techniques described herein where device certificates are exchanged and mutually authenticated may be used to create a secure channel between entities, if a more complex exchange is desired, by using a protocol such as SSL or TLS. Scenarios where a complex exchange of data may occur include: a bulk down-load of other configuration parameters (beyond an initial address assignment) from a DHCP server to a DHCP client; retrieving data from a global database or management directory by a DHCP server or a DNS server; replication of entries between DNS or DHCP servers; network management flows; etc. Therefore, it is intended that the appended claims shall be construed to include the preferred embodiments and all such variations and modifications as fag within the spirit and scope of the invention.

We claim:

1. A computer program product embodied on computer readable media readable by a computing system in a computing environment, for using device certificates to authenticate communicating devices, comprising:

computer-readable program code means for creating a public key, private key pair for a first device, said key pair adapted for use in public key cryptography systems;

computer-readable program code means for creating a first device certificate for said first device, wherein said first device certificate identifies said first device as owning said first device certificate using a globally-unique device identifier associated with a network adapter card directly attached to said first device and wherein said public key is stored in said first device certificate, thereby associating said public key with said globally-unique device identifier;

computer-readable program code means for securely storing said private key on said first device in protected store that is readable only by hardware or firmware of said first device and not by software of said first device;

computer-readable program code means for digitally signing, by said hardware or firmware, a first message using said private key of said key pair and sending said digitally-signed first message, from said first device to a second device;

computer-readable program code means for receiving said digitally-signed first message at said second device;

computer-readable program code means for authenticating, by said second device, said first device as having sent said digitally-signed first message by authenticating said first device's digital signature thereupon;

computer-readable program code means for processing said first message, by said second device, only if said computer-readable program code means for authenticating determines that said first device is authentic, resulting in creation of a second message;

computer-readable program code means for returning said second message from said second device to said first device, only if said computer-readable program code means for authenticating determines that said first device is authentic; and computer-readable program code means for receiving said returned second message at said first device.

2. The computer program product as claimed in claim 1, wherein:

said computer-readable program code means for digitally signing sending said first message creates a first digital signature over one or more fields of said first message, wherein said one or more fields includes at least said globally-unique device identifier, and wherein said first device certificate is sent along with said digitally-signed first message;

said computer-readable program code means for receiving said digitally-signed first message further comprises computer-readable program code means for receiving said first device certificate, in addition to said digitally-signed first message; and said computer-readable program code mean for authenticating said first device further comprises:

computer-readable program code means for decrypting said first digital signature using said public key stored in said first device certificate;

computer-readable program code means for obtaining a certificate authority (CA) public key associated with a CA which created a second digital signature stored in said first device certificate;

computer-readable program code means for decrypting said second digital signature using said obtained CA public key;

computer-readable program code means or concluding that said first device certificate is authentic if said decrypted second digital signature is authentic; and computer-readable program code means for concluding that said first device is authentic if (1) said decrypted first digital signature is authentic, (2) a device identifier value covered by said decrypted first digital signature matches a globally-unique device identifier which identifies a sender of said first message, and (3) said first device certificate is authentic.

3. The computer program product as claimed in claim 2, wherein:

said computer-readable program code means for processing said first message further comprises computer-readable program code means for digitally signing, by said second device, one or more fields of said resulting second message, using a second private key associated with said second device and resulting in creation of a third digital signature;

said computer-readable program code means for returning said second message further comprises computer-readable program code means for returning along with said second message: (1) a second device certificate, wherein said second device certificate comprises (a) a second globally-unique device identifier associated with a network adapter card of said second device, thereby identifying said second device as owning said second device certificate and (b) a second public key, said second public key associated with said second private key and adapted for use in public key cryptography systems, thereby associating said second public key with said second globally-unique device identifier, and (2) said thud digital signature; and said computer-readable program code means for receiving said returned second message at said fist device also receives said second device certificate and said third digital signature; and further comprising:

computer-readable program code means for decrypting, by said first device, said received third digital signature using said second public key stored in said received second device certificate;

computer-readable program code means for obtaining, by said first device, a second CA public key associated with a second CA which created a fourth digital signature stored in said second device certificate;

computer-readable program code means for decrypting, by said first device, said fourth digital signature using said obtained second CA public key;

computer-readable program code means for concluding that said second device certificate is authentic if said decrypted fourth digital signature is authentic;

computer-readable program code means for concluding that said second device is authentic if (1) said decrypted third digital signature is authentic, (2) a third device identifier value covered by said decrypted third digital signature matches a globally-unique device identifier which identifies a sender of said second message, and (3) said second device certificate is authentic; and computer-readable program code means for using said received second message at said first device only if said second device is authentic.

4. The computer program product as claimed in claim 2, wherein:
  a CA certificate containing said CA public key is sent, along with said digitally-signed first message and said first device certificate, to said second device using a copy of said CA certificate stored at said first device; and
  said computer-readable program code means for obtaining said CA public key uses said sent CA certificate.

5. The computer program product as claimed in claim 3, wherein:
  said computer-readable program code means for returning said second message, said second device certificate, and said third digital signature also returns a second CA certificate containing said second CA public key to said first device using a second device copy of said second CA certificate; and
  said computer-readable program code means for obtaining said second CA public key uses said returned CA certificate.

6. The computer program product as claimed in claim 3, further comprising:
  computer-readable program code means for creating a handshaking message by said first device, wherein said handshaking message comprises one or more message fields and a further digital signatures wherein said one or more message fields include a time stamp, said fourth digital signature computed over said one or more message fields;
  computer-readable program code means for sending said handshaking message from said first device to said second device;
  computer-readable program code means for receiving said handshaking message at said second device;
  computer-readable program code means for decrypting said fourth digital signature using said public key of said first device; and
  computer-readable program code means for completing a message exchange initiated by said first message and said second message if said decrypted fourth digital signature is valid and said time stamp is not stale.

7. The computer program product as claimed in claim 1, wherein said protected storage is a write-only memory of said first device, said write-only memory having an ability to perform computations using data values previously stored therein.

8. The computer program product as claimed in claim 1, wherein said protected storage is a read-write memory of said first device, said read-write memory being readable only by means of a shared secret key.

9. The computer program product as claimed in claim 1, wherein said address identifying said first device in said first device certificate is a medium access control (MAC) address of said network adapter card.

10. The computer program product as claimed in claim 3, further comprising:
  computer-readable program code means for generating, by said first device, a first challenge;
  computes-readable program code means for including, by said first device, said first challenge in said one or more fields of said first message; and
  computer-readable program code means for including, by said second device, said first challenge in said one or more fields of said second message; and
  wherein said computer-readable program code means for using said received second message further comprises using said received second message only if said signed first challenge is valid.

11. The computer program product as claimed in claim 6, further comprising:
  computer-readable program code mean for generating, by said first device, a first challenge;
  computer-readable program code means or including, by said first device, said first challenge in said one or more fields of said first message;
  computer-readable program code means for generating, by said second device, a second challenge;
  computer-readable program code means for including said first challenge and said second challenge in said one or more fields of said second message; and
  computer-readable program code means for including, by said first device, said second challenge in said one or more message fields of said handshaking message; and wherein:
  said computer-readable program code means for using said received second message further comprises using said received second message only if said signed first challenge is valid; and
  said computer-readable program code means for completing said message exchange farther copses completing said message exchange only if said signed second challenge is valid.

12. A computer program product embodied on computer readable media readable by a coring system in a computing environment, for using device certificates to automatically authenticate a communicating device, comprising:
  computer-readable program code means for creating a public key, private key pair for a device that will function as a device, said key pair adapted for use in public key cryptography systems;
  computer-readable program code means for creating a device certificate for said server device, wherein said device certificate identifies said server device as owning said device certificate using a globally-unique device identifier associated with a network adapter card directly attached to said server device and wherein said public key is stored in said device certificate, thereby associating said public key with said globally-unique device identifier;
  computer-readable program code means for securely storing said private key on said server device in protected storage that is readable only by hardware or firmware of said server device and not by software of said server device;
  computer-readable program code means for sending a first message from a client device to said server device;
  computer-readable program code means for receive said first message at said server device;
  computer-readable program code means for processing, by said server device, said first massage, resulting in creation of a second message;
  computer-readable program code means for digitally signing, by said hardware or firmware, said second message, using said private key of said key pair, and returning said digitally-signed second message to said client device;
  computer-readable program code means for receiving said returned digitally-signed second message at said client device;
  computer-readable program code means for authenticating said server device, by said client device, as having sent said digitally-signed second message by authenticating said server device's digital signature thereupon, responsive to receiving said returned digitally-signed second message; and computer-readable program code means for using said received second message at said client device only if said computer-readable program code means for authenticating determines that said server device is authentic.

13. The computer program product as claimed in claim 12, wherein:

said computer-readable program code means for digitally signing said second message creates a first digital signature over one or more fields of said second message, and wherein said device certificate is sent along with said digitally-signed second message; and said computer-readable program code mean for receiving said returned digitally-signed second message also receives said device certificate; and said computer-readable program code means for authenticating further comprising:

computer-readable program code means for decrypting, by said client device, said first digital signature using said public key stored in said received device certificate;

computer-readable program code means for obtaining by said client device, a certificate authority (CA) public key associated with a CA which created a second digital signature stored in said device certificate;

computer-readable program code means for decrypting, by said client device, said second digital nature using said obtained CA public key;

computer-readable program code means for concluding that said device certificate is authentic if said decrypted second digital size is authentic; and computer-readable program code means for concluding that said server device is authentic if (1) said decrypted first digital signature is authentic, (2) a device identifier value covered by said decrypted first digital signature matches a globally-unique device identifier which identifies a sender of said second message, and (3) said device certificate is authentic.

14. The computer program product as claimed in claim 13, wherein said server device is executing a Dynamic Host Configuration Protocol (DHCP) service.

15. The computer program product as claimed in claim 13, wherein said server device is executing a Domain Name System (DNS) service.

16. A system for using device certificates to authenticate communicating devices in a computing environment, comprising:

means for creating a public key, private key pair for a first device, said key pair adapted for use in public key cryptography systems;

means for creating a first device certificate for said first device, wherein said first device certificate identifies said first device as owning said first device certificate using a globally-unique device identifier associated with a network adapter card directly attached to said first device and wherein said public key is stored in said first device certificate, thereby associating said public key with said globally-unique device identifier;

means for securely storing said private key on said first device in protected storage that is readable only by hardware or firmware of said first device and not by software of said first device;

means for digitally signing, by said hardware or firmware, a first message using said private key of said key pair and sending said digitally-signed first message from said first device to a second device;

means for receiving said digitally-signed first message at said second device;

means for authenticating by said second device, said first device as having sent said digitally-signed first message by authenticating said first device's digital signature thereupon;

means for processing said first message, by said second device, only if said means for authenticating determines that said first device is authentic, resulting in creation of a second message;

means for returning said second message from said second device to said first device, only if said means for authenticating determines that said first device is authentic; and means for receiving said returned second message at said first device.

17. The system as claimed in claim 16, wherein:

said means for digitally signing said first message creates a first digital signature over one or more fields of said first message, wherein said one or more fields includes at least said globally-unique device identifier, and wherein said first device certificate is sent along with said digitally-signed first message;

said means for receiving said digitally-signed first message further comprises means for receiving said first device certificate, in addition to said digitally-signed first message; and said means for authenticating said first device further comprises:

means for decrypting said first digital signature using said public key stored in said first device certificate;

means for obtaining a certificate authority (CA) public key associated a CA which created a second digital signature stored in said first device certificate;

means for decrypting said second digital signature using said obtained CA public key;

means for concluding that said first device certificate is authentic if said decrypted second digital signature is authentic; and means for concluding that said first device is authentic if (1) said decrypted first digital signature is authentic, (2) a device identifier value covered by said decrypted first digital signature matches a globally-unique device identifier which identifies a sender of said first message, and (3) said first device certificate is authentic.

18. The system as claimed in claim 17, wherein:

said means for processing said first message further comprises means for digitally signing, by said second device, one or more fields of said resuming second message, using a second private key associated with said second device and resulting in creation of a third digital signature;

said means for returning said second message further comprises means for returning, along with said second message: (1) a second device certificate, wherein said second device certificate comprises (a) a second globally-unique device identifier associated with a network adapter card of said second device, thereby identifying said second device as owning said second device certificate and (b) a second public key, said second public key associated with said second private key and adapted for use in public key cryptography systems, thereby associating said second public key with said second globally-unique device identifier, and (2) said third digital signature; and said men for receiving said returned second message at said first device also receives said second device certificate and said third digital signature; and further comprising:

means for decrypting, by said first device, said received third digital signature said second public key stored in said received second device certificate;

means for obtaining, by said first device, a second CA public key associated with a second CA which created a fourth digital signature stored in said second device certificate;

means for decrypting, by said first device, said fourth digital signature using said obtained second CA public key;

means for concluding that said second device certificate is authentic if said decrypted fourth digital signature is authentic;

means for concluding that said second device is authentic if (1) said decrypted third digital signature is authentic, (2) a third device identifier value covered by said decrypted third digital signature matches a globally-unique device identifier which identifies a sender of said second message, and (3) said second device certificate is authentic; and means for using said received second message at said first device only if said second device is authentic.

19. The system as claimed in claim 17, wherein:

a CA certificate containing said CA public key is sent, along with said digitally-signed first message and said first device certificate to said second device using a copy of said CA certificate stored at said first device; and said means for obtaining said CA public key uses said sent CA certificate.

20. The system as claimed in claim 18, wherein:

said means for ret said second message, said second device certificate, and said third digital signature also returns a second CA certificate containing said second CA public key to said first device using a second device copy of said second CA certificate; and said means for obtaining said second CA public key uses said returned CA certificate.

21. The system as claimed in claim 18, further comprising:

means for creating a handshaking message by said first device, wherein said handshaking message comprises one or more message fields and a fourth digital signature, wherein said one or more message fields include a time stamp, said fourth digital signature computed over said one or more message fields;

means for sending said handshaking message from said first device to said second device;

means for receiving said handshaking message at said second device;

means for decrypting said fourth digital signature using said public key of said first device; and means for completing a message exchange initiated by said first message and said second message if said decrypted fourth digital signature is valid and said time stamp is not stale.

22. The system as claimed in claim 16, wherein said protected storage is a write-only memory of said first device, said write-only memory having an ability to perform computations using data values previously stored therein.

23. The system as claimed in claim 16, wherein said protected storage is a read-write memory of said first device, said read-write memory being readable only by means of a shared secret key.

24. The system as claimed in claim 16, wherein said address identifying said first device in said first device certificate is a medium access control (MAC) address of said network adapter card.

25. The system as claimed in claim 18, further comprising:

means for generating, by said first device, a first challenge;

means for including, by said first device, said first challenge in said one or more fields of said first message; and means for including, by said second device, said first challenge in said one or more fields of said second message; and wherein said means for using said received second message further comprises using said received second message only if said signed first challenge is valid.

26. The system as claimed in claim 21, further comprising:

means for generating, by said first device, a first challenge;

means for including, by said first device, said fist challenge in said one or more fields of said first message;

means for generating, by said second device, a second challenge;

means for including said first challenge and said second challenge in said one or more fields of said second message; and means for including, by said first device, said second challenge in said one or more message fields of said handshaking message; and wherein:

said means for using said received second message further comprises using said received second message only if said signed first challenge is valid; and said means for completing said message exchange further comprises completing said message exchange only if said signed second challenge is valid.

27. A system for using device certificates to automatically authenticate a communicating device in a computing environment, comprising:

means for creating a public key, private key pair for a device that will function as a server device, said key pair adapted for use in public key cryptography systems;

means for creating a device certificate for said server device, wherein said device certificate identifies said sever device as owning said device certificate using a globally-unique device identifier associated with a network adapter card directly attached to said server device and wherein said public key is stored in said device certificate, thereby associating said public key with said globally-unique device identifier;

means for securely storing said private key on said server device in protected storage that is readable oil by hardware or firmware of said server device and not by software of said server device;

means for sending a first message from a client device to said server device;

means for receiving said first message at said server device;

means for processing, by said server device, said first message, resulting in creation of a second message;

means for digitally signing, by said hardware or firmware, said second message, using said private key of said key pair, and returning said digitally-signed second message to said client device;

means for receiving said returned digitally-signed second message at said client device;

means for authenticating said server device, by said client device, as having sent thereupon, responsive to receiving said returned digitally-signed second message; and means for using said received second message at said client device if said means for authenticating determines that said server device is authentic.

28. The system as claimed in claim 27, wherein:

said means for digitally signing said second message creates a first digital signature over one or more fields of said second message, and wherein said device certificate is sent along with said digitally-signed second message; and said means for receiving said returned digitally-signed second message also receives said device certificate; and said means for receiving said returned digitally-signed second message also receives said device certificate; and said means for authenticating further comprises:

means for decrypting, by said client device, said first digital signature using said public key stored in said received device certificate;

means for obtaining, by said client device, a certificate authority (CA) public key associated with a CA which created a second digital signature stored in said device certificate;

means for decrypting, by said client device, said second digital signature using said obtained CA public key;

means for concluding that said device certificate is authentic if said decrypted second digital signature is authentic; and means for concluding that said server device is authentic if (1) said decrypted first digital signs is authentic, (2) a device identifier value covered by said decrypted first digital signature matches a globally-unique device identifier which identifies a sender of said second message, and (3) said device certificate is authentic.

29. The system as claimed in claim 28, wherein said server device is executing a Dynamic Host Configuration Protocol (DHCP) service.

30. The system as claimed in claim 28, wherein said server device is executing a Domain Name System (DNS) service.

31. A method for using device certificates to authenticate communicating devices in a computing environment, comprising the steps of:

creating a public key, private key pair for a first device, said key pair adapted for use in public key cryptography systems;

creating a first device certificate for said first device, wherein said first device certificate identifies said first device as owning said first device certificate using a globally-unique device identifier associated with a network adapter card directly attached to said first device and wherein said public key is stored in said first device certificate, thereby associating said public key with said globally-unique device identifier;

securely storing said private key on said first device in protected storage that is readable only by hardware or firmware of said first device and not by software of said first device;

digitally signing, by said hardware or firmware, a first message using said private key of said key pair and sending said digitally-signed first message from said first device to a second device;

receiving said digitally-signed first message at said second device;

authenticating, by said second device, said first device as having sent said digitally-signed first message by authenticating said first device's digital signature thereupon;

processing said first message, by said second device, only if said authenticating step determines that said first device is authentic, resulting in creation of a second message, returning said second message from said second device to said first device, only if said authenticating step determines that said first device is authentic; and receiving said returned second message at said first device.

32. The method as claimed in claim 31, wherein:

said step of digitally signing said first message creates a first digital signature over one or more fields of said first message, wherein said one or more fields includes at least said globally-unique device identifier, and wherein said first device certificate is sent along with said digitally-signed first message;

said step of receiving said digitally-signed first message further comprises receiving said first device certificate, in addition to said digitally-signed first message; and said step of authenticating said first device further comprises the steps of:

decrypting said first digital signature using said public key stored in said first device certificate;

obtaining a certificate authority (CA) public key associated with a CA which created a second digital signature stored in said first device certificate;

decrypting said second digital signature using said obtained CA public key;

concluding that said first device certificate is authentic if said decrypted second digital signature is authentic; and concluding that said first device is authentic if (1) said decrypted first digital signature is authentic, (2) a device identifier value covered by said decrypted first digital signature matches a globally-unique identifier which identifies a sender of said first message, and (3) said first device certificate is authentic.

33. The method as claimed in claim 32, wherein:

said step of processing said first message further comprises the step of digitally signing, by said second device, one or more fields of said resulting second message, using a second private key associated with said second device and resulting in creation of a third digital signature;

said step of returning said second message further comprises the step of returning, along with said second message: (1) a second device certificate, wherein said second device certificate comprises (a) a second globally-unique device identifier associated with a network adapter card of said second device, thereby identifying said second device as owning said second device certificate and (b) a second public key, said second public key associated with said second private key and adapted for use in public key cryptography systems, thereby associating said second public key with said second globally-unique device identifier, and (2) said third digital signature; and said step of receiving said returned second message at said first device also receives said second device certificate and said third digital signature; and further comprising the steps of:

decrypting, by said first device, said received third digital signature using said second public key stored in said received second device certificate;

obtaining, by said first device, a second CA public key associated with a second CA which created a fourth digital signature stored in said second device certificate;

decrypting, by said first device, said further digital signature using said obtained second CA public key;

concluding that said second device certificate is authentic if said decrypted fourth digital signature is authentic;

concluding that said second device is authentic if (1) said decrypted third digital signature is authentic, (2) a third device identifier valve covered by said decrypted third digital signature matches a globally-unique device identifier which identifies a sender of said second message, and (3) said second device certificate is authentic; and using said received second message at said first device only if said second device is authentic.

34. The method as claimed in claim 32, wherein:

a CA certificate containing said CA public key is sent, alone with said digitally-signed first message and said first device certificate, to said second device using a copy of said CA certificate stored at said first device; and said step of obtaining said CA public key uses said sent CA certificate.

35. The method as claimed in claim 33, wherein:

said step of said second message, said second device certificate, and said third digital signature also returns a second CA certificate containing said second CA public key to said first device using a second device copy of said second CA certificate; and said step of obtaining said second CA public key uses said returned CA certificate.

36. The method as claimed in claim 33, further comprising the steps of:

creating a handshaking message by said first device, wherein said handshaking message comprises one or more message fields and a fourth digital signature, wherein said one or more message fields include a time stamp, said fourth digital signature computed over said one or more message fields;

sending said handshaking message from said first device to said second device;

receiving said handshaking message at said second device;

decrypting said fourth digital signature using said public key of said first device; and completing a message exchange initiated by said first message and said second message if said decrypted fourth digital signature is valid and said time stamp is not stale.

37. The method as claimed in claim 31, wherein said protected storage is a write-only memory of said first device, said write-only memory having an ability to perform computations using data values previously stored therein.

38. The method as claimed in claim 31, wherein said protected storage is a read-write memory of said first device, said read write memory being readable only by means of a shared secret key.

39. The method as claimed in claim 31, wherein said address identifying said first device in said first device certificate is a medium access control (MAC) address of said network adapter card.

40. The method as claimed claim 33, further comprising the steps of:

generating, by said first device, a first challenge;

including, by said first device, said first challenge in said one or more fields of said first message; and including, by said second device, said first challenge in said one or more fields of said second message; and wherein said step of using said received second message further comprises using said received second message only if said signed first challenge is valid.

41. The method as claimed in claim 36, further comprising the steps of:

generating, by said first device, a first challenge;

including, by said first device, said first challenge in said one or more fields of said first message;

generating, by said second device, a second challenge;

including said first challenge and said second challenge in said one or more fields of said second message; and including, by said first device, said second challenge in said one or more message fields of said handshaking message; and wherein:

said step of using said received second message or comprises using said received second message only if said signed first challenge is valid; and said step of completing said message exchange further comprises completing said message exchange only if said signed second challenge is valid.

42. A method for using device certificates to automatically authenticate a communicating device in a computing environment, comprising the step of:

creating a public key, private key pair for a device that will function as a server device, said key pair adapted for use in public key cryptography systems;

creating a device certificate for said server device, wherein said device certificate identifies said server device as owning said device certificate using a globally-unique device identifier associated with a network adapter card directly attached to said server device and wherein said public key is stored in said device certificate, thereby associating said public key with said global-unique device identifier;

securely storing said private key on said server device in protected storage that is readable only by hardware or firmware of said serve device and not by software of said server device;

sending a first message from a client device to said server device;

receiving said first message at said server device;

processing, by said server device, said first message, resulting in creation of a second message;

digitally signing, by said hardware or firmware, said second message, using said private key of said key pair, and returning said digitally-signed second message to said client device:

receiving said returned digitally-signed second message at said client device;

authenticating said severer device, by said client device, as having sent said digitally-signed second message by authenticating said server device's digital signature thereupon, responsive to receiving said returned digitally-signed second message; and using said received second message at said client device if said authenticating step determines that said server device is authentic.

43. The method as claimed in claim 42, wherein:

said step of digitally signing said second message crates a first digital signature over one or more fields of said second message, and wherein said device certificate is sent along with said digitally-signed second message; and said step of receiving said returned digitally-signed second message also receives said device certificate; and said step of authenticating further comprises the steps of:
 decrypting, by said client device, said first digital signature using said public key stored in said received device certificate;
 obtaining, by said client device, a certificate authority (CA) public key associated with a CA which created a second digital signature stored in said device certificate;
 decrypting, by said client device, said second digital sure using said obtained CA pubic key,
 concluding that said device certificate is authentic if said decrypted second digital signature is authentic; and
 including that said server device is authentic if (1) said decrypted first digital signature is authentic, (2) a device identifier value covered by said decrypted first digital signature matches a globally-unique device identifier which identifies a sender of said second message, and (3) said device certificate is authentic.

44. The method as claimed in claim 43, wherein said server device is executing a Dynamic Host Configuration Protocol (DHCP) service.

45. The method as claimed in claim 43, wherein said server device is executing a Domain Name System (DNS) service.

46. A computer-implemented method of using device certificates to authenticate communicating devices, comprising steps of:

digitally signing a message, by a first device where said message is created, using a private key from a public key cryptography public/private key pair of the fist device thereby creating a digital signature for the message, wherein (1) a globally-unique identifier associated with a network adapter card of the first device is stored in a device certificate that is associated with the first device, thereby identifying the first device as an owner of the device certificate; (2) the public key is stored in the device certificate, thereby associating the public key with the globally-unique identifier; and (3) the private key is stored in device-resident, access-protected storage of the first device; and authenticating the first device, by a receiver of the digitally-signed message, before the receiver will act upon contents of the message, further comprising steps of:
 authenticating the it device as having created the digital signature on the digitally-signed message, by the receiver, using the public key of the first device; and
 ensuring that the globally-unique identifier stored in the device certificate matches a device identifier that identifies a sender of the digitally-signed message.

47. A computer-implemented method of using device certificates to authenticate communicating devices, comprising steps of:

authenticating a first device, by a second device that receives a digitally-signed first message from the fist device, using a first device certificate of the first device; and responsive to a successful outcome of the authenticating step, responding to the first message, further comprising steps of:
 digitally signing a second message, by the second device where the second message is created, using a private key from a public key cryptography public/private key pair of the second device, thereby creating a digital signature for the second message, wherein (1) a globally-unique identifier associated with a network adapter card of the second device is stored in a second device certificate that is associated with the second device, thereby identifying the second device as an owner of the second device certificate; (2) the public key is stored in the second device certificate, thereby associating the public key with the globally-unique identifier; (3) the private key is stored in device-resident, access-protected storage of the second device; and (4) the second message includes the second device certificate, such that the digital signature on the second message covers the public key and the globally-unique identifier of the second device;
 authenticating the second device as having created the digital size on the digitally-signed second message, by the first device upon receipt thereof using the public key of the second device; and
 that the second message was sent to the first device by the second device by comparing the globally-unique identifier stored in the second device certificate to a device identifier that identifies a sender of the digitally-signed second message.

* * * * *

UNITED STATES PATENT AND TRADEMARK OFFICE
CERTIFICATE OF CORRECTION

PATENT NO. : 6,826,690 B1
DATED : November 30, 2004
INVENTOR(S) : John R. Hind et al.

It is certified that error appears in the above-identified patent and that said Letters Patent is hereby corrected as shown below:

Column 2,
Line 31, change "P addresses" to -- IP addresses --.

Column 3,
Line 44, change "Object" to -- Another object --.

Column 6,
Line 39, change "Configuration-Protocol" to -- Configuration Protocol --.

Column 7,
Line 44, change "device" to -- devices --;
Line 54, change "dice" to -- device --.

Column 8,
Line 42, change "User" to -- A user --;
Line 56, change "The To" to -- The --.

Column 10,
Line 5, change "09/316,696" to -- 09/316,686 --;
Line 38, change "embodiments" to -- preferred embodiments --.

Column 11,
Line 37, change "data" to -- configuration data --.

Column 12,
Line 65, change "data" to -- data transmission --.

Column 13,
Line 29, change "checking" to -- checking the --;
Line 52, change "a address" to -- an address --;
Line 61, change "tale" to -- taking --.

Column 14,
Line 6, change "and L0" to -- and --;
Line 23, change "exchange" to -- exchanges --.

UNITED STATES PATENT AND TRADEMARK OFFICE
CERTIFICATE OF CORRECTION

PATENT NO. : 6,826,690 B1
DATED : November 30, 2004
INVENTOR(S) : John R. Hind et al.

It is certified that error appears in the above-identified patent and that said Letters Patent is hereby corrected as shown below:

Column 15,
Line 14, change "level" to -- level, --;
Line 16, change "convey" to -- conveying --;
Line 30, change "exiting" to -- existing --;
Line 38, change "way" to -- may --.

Column 17,
Line 33, change "ins" to -- in --;
Line 38, change "fist" to -- first --;
Line 57, change "reclusively" to -- recursively --;
Line 61, change "ver" to -- verify --.

Column 18,
Line 15, change "any" to -- may --;
Line 53, change "sever" to -- server --;
Line 59, change "commits" to -- commit --.

Column 19,
Line 13, change "and B" to -- and 8B --;
Line 15, change "handshaking," to -- handshaking --;
Line 28, change "certificate" to -- certificate, --;
Line 35, change "tong" to -- transferring --.

Column 20,
Line 6, change "sever's" to -- server's --;
Line 66, change "fag" to -- fall --.

Column 21,
Line 22, change "store" to -- storage --;
Line 27, change "message," to -- message --.

Column 22,
Line 8, change "or" to -- for --;
Line 28, change "returning" to -- returning, --;
Line 39, change "thud" to -- third --;
Line 41, change "fist" to -- first --.

Column 23,
Line 26, change "further" to -- fourth--; and change "signatures" to -- signature, --.

UNITED STATES PATENT AND TRADEMARK OFFICE
CERTIFICATE OF CORRECTION

PATENT NO. : 6,826,690 B1
DATED : November 30, 2004
INVENTOR(S) : John R. Hind et al.

It is certified that error appears in the above-identified patent and that said Letters Patent is hereby corrected as shown below:

Column 24,
Line 7, change "or" to -- for --;
Line 25, change "farther copses" to -- further comprises --;
Line 29, change "coring" to -- computing --;
Line 34, change "device" to -- server device --;
Line 53, change "for receive" to -- for receiving --.

Column 25,
Line 23, change "comprising" to -- comprises --;
Line 34, change "nature" to -- signature --;
Line 38, change "size" to -- signature --.

Column 26,
Line 62, change "resuming" to -- resulting --.

Column 27,
Line 12, change "men" to -- means --;
Line 17, change "said" to -- using said --;
Line 42, change "certificate" to -- certificate, --;
Line 48, change "ret" to -- returning --.

Column 28,
Line 36, change "fist" to -- first --;
Line 64, change "sever" to -- server --.

Column 29,
Line 5, change "oil" to -- only --;
Line 21, change "sent" to -- sent said digitally-signed second message by authenticating said server device's digital signature --;
Lines 36-38 should be deleted;
Line 53, change "signs" to -- signature --.

Column 31,
Line 53, change "step or" to -- step of returning --.

UNITED STATES PATENT AND TRADEMARK OFFICE
CERTIFICATE OF CORRECTION

PATENT NO. : 6,826,690 B1
DATED : November 30, 2004
INVENTOR(S) : John R. Hind et al.

It is certified that error appears in the above-identified patent and that said Letters Patent is hereby corrected as shown below:

Column 32,
Line 47, change "message or" to -- message further --;
Line 66, change "global-unique" to -- globally-unique --.

Column 33,
Line 3, change "sever" to -- server --;
Line 17, change "severer" to -- server --;
Line 26, change "crates" to -- creates --;
Line 48, change "including" to -- concluding --.

Column 34,
Line 3, change "fist" to -- first --;
Line 4, change "device" to -- device, --;
Line 18, change "the it" to -- the first --;
Line 28, change "fist" to -- first --;
Line 54, change "size" to -- signature --;
Line 55, change "thereof" to -- thereof, --;
Line 57, change "that" to -- ensuring that --.

Signed and Sealed this

Seventh Day of June, 2005

JON W. DUDAS
*Director of the United States Patent and Trademark Office*